(12) United States Patent
Topliss et al.

(10) Patent No.: US 8,588,598 B2
(45) Date of Patent: Nov. 19, 2013

(54) SHAPE MEMORY ALLOY ACTUATION APPARATUS

(75) Inventors: Richard Topliss, Cambridge (GB); Andrew Benjamin David Brown, Cambridge (GB)

(73) Assignee: Cambridge Mechatronics Limited, Cambridge (GB)

( * ) Notice: Subject to any disclaimer, the term of this patent is extended or adjusted under 35 U.S.C. 154(b) by 246 days.

(21) Appl. No.: 13/056,928

(22) PCT Filed: Jul. 24, 2009

(86) PCT No.: PCT/GB2009/001853
§ 371 (c)(1),
(2), (4) Date: Apr. 11, 2011

(87) PCT Pub. No.: WO2010/012991
PCT Pub. Date: Feb. 4, 2010

(65) Prior Publication Data
US 2011/0179786 A1 Jul. 28, 2011

(30) Foreign Application Priority Data

Jul. 30, 2008 (GB) .................................. 0813912.3
Mar. 11, 2009 (GB) .................................. 0904213.6

(51) Int. Cl.
*G02B 7/08* (2006.01)
*G02B 7/10* (2006.01)

(52) U.S. Cl.
USPC .................. 396/72; 396/73; 396/132; 396/84

(58) Field of Classification Search
USPC ............ 60/527; 396/132, 84, 418, 72, 85, 86, 396/87
See application file for complete search history.

(56) References Cited

U.S. PATENT DOCUMENTS

| 4,977,886 A | 12/1990 | Takehana et al. |
| 5,150,702 A | 9/1992 | Miyanaga et al. |

(Continued)

FOREIGN PATENT DOCUMENTS

| EP | 0 841 510 A1 | 5/1998 |
| EP | 1 626 177 A1 | 2/2006 |

(Continued)

OTHER PUBLICATIONS

International Search Report for PCT/GB2007/001050 mailed Aug. 30, 2007.

(Continued)

*Primary Examiner* — Thomas E. Denion
*Assistant Examiner* — Shafiq Mian
(74) *Attorney, Agent, or Firm* — Nixon & Vanderhye P.C.

(57) ABSTRACT

A shape memory alloy actuation apparatus comprises a movable element suspended on a support structure by a plurality of flexures which are non-uniformly configured to apply forces having differing components perpendicular to the movement axis generating a net moment around the center of mass of the movable element in an opposite sense from the moment generated by the actuation force. A shape memory alloy wire is coupled between the support structure and an intermediate body engaging the movable element through a pivotal contact to avoid lateral force transfer. Also coupled between the support structure and the intermediate body is a resilient biassing flexure plastically deformed in a partial region thereof. The shape memory alloy wire is crimped by a crimping member fixed to the support structure holding the shape memory alloy wire against a curved surface from which the shape alloy memory wire extends to the movable element.

23 Claims, 9 Drawing Sheets

(56) References Cited

U.S. PATENT DOCUMENTS

| | | | |
|---|---|---|---|
| 5,459,544 A | 10/1995 | Emura | |
| 5,763,979 A | 6/1998 | Mukherjee et al. | |
| 6,157,779 A | 12/2000 | Kosaka et al. | |
| 6,307,678 B2 | 10/2001 | Kosaka et al. | |
| 6,434,333 B2 | 8/2002 | Tanaka et al. | |
| 6,434,932 B2 | 8/2002 | Hara et al. | |
| 6,449,434 B1 * | 9/2002 | Fuss | 396/97 |
| 6,516,146 B1 | 2/2003 | Kosaka | |
| 6,554,501 B2 | 4/2003 | Kosaka et al. | |
| 6,574,958 B1 * | 6/2003 | MacGregor | 60/527 |
| 6,833,656 B2 | 12/2004 | Hooley et al. | |
| 6,945,045 B2 | 9/2005 | Hara et al. | |
| 7,068,930 B2 | 6/2006 | McKevitt et al. | |
| 7,224,813 B2 | 5/2007 | Hooley et al. | |
| 7,295,389 B2 | 11/2007 | Ohtsuka et al. | |
| 8,175,449 B2 * | 5/2012 | Kubo et al. | 396/89 |
| 2001/0002226 A1 | 5/2001 | Tanaka et al. | |
| 2001/0025477 A1 | 10/2001 | Hara et al. | |
| 2002/0001467 A1 | 1/2002 | Tanaka et al. | |
| 2002/0113499 A1 | 8/2002 | Von Behrens et al. | |
| 2002/0136548 A1 * | 9/2002 | Fuss | 396/89 |
| 2006/0048511 A1 | 3/2006 | Everson et al. | |
| 2006/0067658 A1 | 3/2006 | Wirt | |
| 2006/0098968 A1 * | 5/2006 | Ito et al. | 396/85 |
| 2006/0109570 A1 | 5/2006 | Ohtsuka et al. | |
| 2006/0120708 A1 | 6/2006 | Kosaka et al. | |
| 2006/0150627 A1 | 7/2006 | Oohara | |
| 2006/0185359 A1 | 8/2006 | Hamaguchi et al. | |
| 2006/0209195 A1 | 9/2006 | Goto | |
| 2006/0266031 A1 | 11/2006 | Kosaka et al. | |
| 2006/0272328 A1 | 12/2006 | Hara et al. | |
| 2007/0047938 A1 | 3/2007 | Suzuki et al. | |
| 2007/0058070 A1 | 3/2007 | Chen | |
| 2007/0294873 A1 | 12/2007 | Bogursky et al. | |
| 2008/0278030 A1 | 11/2008 | Hara et al. | |
| 2008/0278590 A1 | 11/2008 | Tanimura et al. | |
| 2008/0282696 A1 | 11/2008 | Wada et al. | |
| 2009/0295986 A1 | 12/2009 | Topliss et al. | |
| 2010/0060776 A1 | 3/2010 | Topliss et al. | |
| 2010/0074607 A1 | 3/2010 | Topliss et al. | |
| 2010/0074608 A1 | 3/2010 | Topliss | |
| 2010/0275592 A1 | 11/2010 | Topliss et al. | |
| 2010/0283887 A1 | 11/2010 | Topliss et al. | |

FOREIGN PATENT DOCUMENTS

| | | |
|---|---|---|
| EP | 1 640 757 | 3/2006 |
| EP | 1 666 216 A1 | 6/2006 |
| EP | 1 914 422 A1 | 4/2008 |
| EP | 2 239 610 A1 | 10/2010 |
| EP | 2 302 434 A1 | 3/2011 |
| GB | 2 398 854 A | 9/2004 |
| GB | 2 434 214 A | 7/2007 |
| GB | 2467481 A | 8/2010 |
| JP | 61-229977 | 10/1986 |
| JP | 9-127398 | 5/1997 |
| JP | 2002-99019 | 4/2002 |
| JP | 2002-130114 | 5/2002 |
| JP | 2004-38058 | 2/2004 |
| JP | 2004-212882 | 7/2004 |
| JP | 2004-333995 A | 11/2004 |
| JP | 2005-195998 | 7/2005 |
| JP | 2005-275270 | 10/2005 |
| JP | 2006-330542 | 12/2006 |
| JP | 2007-060530 A | 3/2007 |
| JP | 2007-315352 | 12/2007 |
| JP | 2009-122602 A | 6/2009 |
| WO | WO 94/19051 | 9/1994 |
| WO | WO 01/47041 A2 | 6/2001 |
| WO | WO 02/103451 A1 | 12/2002 |
| WO | WO 03/048831 A2 | 6/2003 |
| WO | WO 2005/003834 A1 | 1/2005 |
| WO | WO 2005/026539 A2 | 3/2005 |
| WO | WO 2005/075823 A1 | 8/2005 |
| WO | WO 2005/093510 A2 | 10/2005 |
| WO | WO 2006/054535 | 5/2006 |
| WO | WO 2006/059098 A1 | 6/2006 |
| WO | WO 2006/061623 A1 | 6/2006 |
| WO | WO 2006/105588 | 10/2006 |
| WO | WO 2007/018086 A1 | 2/2007 |
| WO | WO 2007/113478 A1 | 10/2007 |
| WO | WO 2007113478 A1 * | 10/2007 |
| WO | WO 2007/113478 A1 | 11/2007 |
| WO | WO 2008/099155 A1 | 8/2008 |
| WO | WO 2008/129290 A1 | 10/2008 |
| WO | WO 2008/129291 A2 | 10/2008 |
| WO | WO 2009/096207 A1 | 8/2009 |

OTHER PUBLICATIONS

Written Opinion of the International Searching Authority for PCT/GB2007/001050 mailed Aug. 30, 2007.

International Search Report for PCT/GB2008/003657 mailed May 27, 2009.

Written Opinion of the International Searching Authority for PCT/GB2008/003657 mailed May 27, 2009.

International Search Report for PCT/GB2008/000478, mailed Sep. 24, 2008.

Written Opinion of the International Searching Authority for PCT/GB2008/000478, mailed Sep. 24, 2008.

International Search Report for PCT/GB2009/001853 mailed Mar. 29, 2011.

* cited by examiner

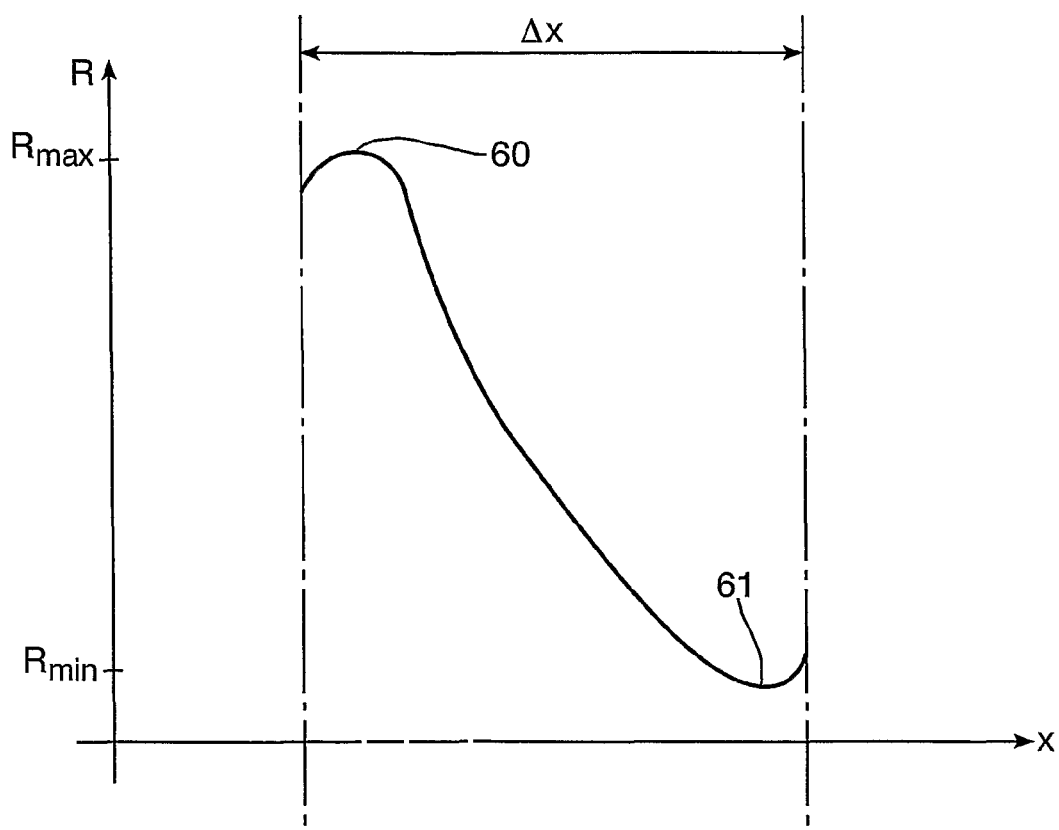

SHAPE MEMORY ALLOY ACTUATION APPARATUS

This application is the U.S. national phase of International Application No. PCT/GB2009/001853 filed 24 Jul. 2009, which designated the U.S. and claims priority to GB Application No. 0813912.3 filed 30 Jul. 2008 and GB Application No. 0904213.6filed 11 Mar. 2009, the entire contents of each of which are hereby incorporated by reference.

The present invention relates to an apparatus in which an actuator is used to drive movement of a movable element supported on a support structure. In some aspects, it relates in particular to an apparatus which is a shape memory alloy (SMA) actuation apparatus using SMA material as the actuator.

The present invention is generally applicable to any type of movable element but has particular application to actuation of a camera lens element, for example of the type used in a miniature camera which may be employed in a portable electronic device such as a mobile telephone or a mobile digital data processing and/or transmitting device. In recent years, with the explosive spread of portable information terminals sometimes known as PDAs (portable digital assistants) and portable telephones, an increasing number of devices incorporate a compact digital camera apparatus employing an image sensor. When such a digital camera apparatus is miniaturized using an image sensor with a relatively small image-sensing area, its optical system, including one or more lenses, also needs to be miniaturized accordingly.

To achieve focusing or zooming, an actuation arrangement of some type must be included in the confined volume of such a miniature camera to drive movement of the camera lens element along the optical axis. As the camera lens element is small, the actuation arrangement must be capable of providing precise actuation over a correspondingly small range of movement. At the same time it is desired that the actuator arrangement is itself compact given the desire for miniaturization of the camera apparatus as a whole. In practical terms, these points limit the types of actuation arrangement which can be applied.

Whilst most of the existing cameras rely on variations of the well-known electric-coil motor, a number of other actuation arrangements have been proposed as small drive units for the lens system. Such other actuation arrangements may include transducers based on piezoelectric, electrostrictive or magnetostrictive material, commonly referred to as electro-active devices and one example is an actuator comprising a curved structure of helically coiled piezoelectric bender tape as disclosed in WO-01/47041 which may be used as an actuator for a camera lens as described in WO-02/103451.

Another type of actuation arrangement which has been proposed uses SMA material as an actuator. The SMA actuator is arranged on heating to drive movement of the camera lens element. Actuation may be achieved by control of the temperature of the SMA actuator over an active temperature range in which the SMA actuator changes between martensite and austenite phases in which the stress and strain of the SMA actuator changes. At low temperatures the SMA actuator is in the martensite phase, whereas at high temperatures the SMA actuator transforms into the austenite phase which induces a deformation causing the SMA actuator to contract. The temperature of the SMA actuator may be changed by selectively passing a current through the SMA actuator to heat it causing the phase change. The phase change occurs over a range of temperature due to the statistical spread of transition temperature in the SMA crystal structure. The SMA actuator is arranged so that the contraction drives movement of the movable element. Conventionally a biasing means provides a bias force in an opposite direction from the force applied by the SMA actuator on contraction.

The use of SMA material as an actuator for a small object such as a camera lens element of a miniature camera provides the advantages of being intrinsically linear, providing a high power per unit mass, being a low cost commodity item and being a relatively small component.

It is also necessary to consider the suspension system that suspends the movable element and guides movement along a movement axis. For precision applications, the movement must suffer a minimum of deviance from the nominal movement axis over the range of movement and when the apparatus orientated in different positions. The deviance may be in the form of a relative angular tilt and/or linear translation of the axes. This is particularly true for a camera lens element for which these deviances may cause a degradation of image quality. Thus the suspension system ideally has a low stiffness or resistive force in the direction of the desired motion and high stiffness in all other directions.

Some aspects of the present invention relate to a suspension system comprising a plurality of resilient flexures. These may be coupled between the support structure and the movable element to support the movable element on the support structure and to guide movement of the movable element along a movement axis by deflection of the flexures. Flexures provide numerous benefits as a suspension system. The flexures may be arranged to provide a low stiffness along the movement axis and a high stiffness perpendicular to the movement axis. Similarly, flexures experience a minimal degree of friction against movement, as compared for example to a bearing. Lastly, a suspension system formed by flexures is compact and straightforward to manufacture.

WO-2007/113478 discloses an example of an SMA actuation apparatus in which the movable element is a camera lens element supported by a suspension system comprising a plurality of flexures.

The first aspect of the present invention is concerned with minimising tilt of a movable element supported for movement on a support structure by a suspension system comprising a plurality of flexures, and driven by an actuator arrangement which applies an actuation force to the movable element. There is a potential problem that the actuation force may generate a moment around the centre of mass of the movable element which tends to tilt the movable element.

The problem applies to any type of movable element where tilt is an issue. One situation where the problem is important is where the movable element is a camera lens element in which case tilt can degrade the optical performance of the camera element. For example in the case of a miniature camera, tilt is desirably kept below a limit which may be less than 0.1°. Furthermore in the case of a camera lens element, the requirement that the optics are not obstructed tends to mean that the actuation arrangement is arranged to apply an actuation force at a position displaced considerably from the optical axis such that a relatively large moment is generated around the centre of mass.

To deal with this problem, WO-2007/113478 discloses an arrangement in which the actuator comprises a plurality of lengths of SMA wire held in tension between a camera lens element and a support structure at respective acute angles in positions and orientations around the optical axis such that the forces generated between the camera lens element and the support structure by the lengths of SMA wire are balanced to provide a net effect of substantially no off-axis movement or tilting of the camera lens element. This is effective in reducing tilt, but requires high manufacturing tolerances to properly arrange the lengths of SMA wire. WO-2007/113478 and also WO 2008/099156 do disclose an arrangement having just two lengths of SMA wire so that complete balancing of the actuation force is not achieved. In this case there remains a net force which tilts the camera lens element. Although the tilt is resisted by the flexures of the suspension system, the requirement to provide such resistance puts a design constraint on the lateral stiffness of the flexures and the resultant tilt affects the optical performance of the camera lens element.

According to the first aspect of the present invention, there is provided an apparatus comprising:

a support structure;

a movable element;

a suspension system comprising a plurality of flexures coupled between the support structure and the movable element to support the movable element on the support structure and to guide movement of the movable element along a movement axis by deflection of the flexures;

an actuator arrangement arranged to apply an actuation force to the movable element along the movement axis, the actuation force also generating a moment around the centre of mass of the movable element, wherein the flexures are non-uniformly configured such that the flexures, on movement of the movable element along the movable axis without rotation, apply forces having differing components perpendicular to the movement axis, which components generate a net moment around the centre of mass of the movable element in an opposite sense from the moment generated by the actuation force.

Thus, according to this aspect of the invention, the flexures of the suspension system are purposely designed to have a non-uniform configuration, in contrast to the suspension systems of WO-2007/113478 and WO-2008/099156 in which all the flexures are identical. In particular, the flexures apply forces having components perpendicular to the movement axis of different amounts. These components generate a net moment around the centre of mass of the movable element which is in an opposite sense from the moment generated by the actuation force. In this manner, the forces applied by the flexures, on normal deflection thereof, resist the tilt generated by the actuation force, desirably balancing that moment to prevent tilting of the movable element. Thus tilting is reduced without simply increasing the lateral stiffness of the flexures.

The non-uniform configuration may be applied to flexures including at least one first flexure and at least one second flexure arranged at different positions along the movement axis. In this case, the at least one first flexure and the at least one second flexure may be non-uniformly configured to apply said forces by: having different lengths; and/or being deflected, at a given position of the movable element, by different amounts from their respective non-deflected positions.

The non-uniform configuration of the flexures reduces tilt occurring in a notional plane perpendicular to said moment around the centre of mass generated by the actuation force. Advantageously, the at least one first flexure comprises at least one pair of flexures arranged with mirror symmetry about that notional plane, and the at least one second flexure also comprises at least one pair of flexures also arranged with mirror symmetry about that notional plane. In this case, the symmetry prevents each pair of flexures from causing any tilting of the movable element in other directions.

This aspect of the present invention is particularly applicable to an actuator arrangement that comprises an SMA actuator, such as SMA wire coupled between the support structure and the movable element.

The second aspect of the present invention is concerned with minimising tilt of a movable element supported for movement on a support structure by a suspension system comprising a plurality of flexures, and driven by an actuator arrangement which applies an actuation force to the movable element. There is a potential problem that the actuation force may generate a moment which tends to tilt the movable element. This is particularly the case if the actuator applies a force having a component of force perpendicular to the movement axis.

The problem applies to any type of movable element where tilt is an issue. One situation where the problem is important is where the movable element is a camera lens element in which case tilt can degrade the optical performance of the camera element. For example in the case of a miniature camera, tilt is desirably kept below a limit which may be less than 0.1°. Furthermore in the case of a camera lens element, the requirement that the optics are not obstructed tends to mean that the actuation arrangement is arranged to apply an actuation force at a position displaced considerably from the optical axis such that a relatively large moment is generated around the centre of mass.

To deal with this problem, WO-2007/113478 discloses an arrangement in which the actuator comprises a plurality of lengths of SMA wire held in tension between a camera lens element and a support structure at respective acute angles in positions and orientations around the optical axis such that the forces generated between the camera lens element and the support structure by the lengths of SMA wire are balanced to provide a net effect of substantially no off-axis movement or tilting of the camera lens element. This is effective in reducing tilt, but requires high manufacturing tolerances to properly arrange the lengths of SMA wire.

WO-2007/113478 and also WO-2008/099156 do disclose an arrangement having just two lengths of SMA wire so that complete balancing of the actuation force is not achieved. In this case there remains a net force which tilts the camera lens element. Although the tilt is resisted by the flexures of the suspension system, the requirement to provide such resistance puts a design constraint on the lateral stiffness of the flexures and the resultant tilt affects the optical performance of the camera lens element.

According to the second aspect of the present invention, there is provided a shape memory alloy actuation apparatus comprising:

a support structure;

a movable element;

a suspension system comprising a plurality of resilient flexures coupled between the support structure and the movable element to support the movable element on the support structure and to guide movement of the movable element along a movement axis by deflection of the flexures;

an intermediate body engaging the movable element in a manner providing transfer of force from the intermediate body to the movable element in a first direction along the movement axis whilst allowing pivoting of the intermediate body with respect to the movable element;

a shape memory alloy actuator coupled between the support structure and the intermediate body and arranged to apply an actuation force to the intermediate body in the first direction along the movement axis, on contraction of the shape memory alloy actuator; and a biassing element coupled between the support structure and the intermediate body and arranged to bias the intermediate body relative to the support structure in a second direction along the movement axis, opposite to the first direction.

Thus, the second aspect of the invention makes use of an intermediate body, to which both the SMA actuator and the biassing element both are coupled so that the intermediate body receives both the actuation force and the biassing force. The intermediate body engages the movable element to provide transfer of force from the intermediate body to the movable element along the movement axis on contraction of the SMA, and thereby to drive movement of the movable element. However, the engagement is provided in a manner that allows pivoting of the intermediate body with respect to the movable element. This effectively provides decoupling of the intermediate body from the movable element which reduces the transfer of off-axis forces perpendicular to the movement axis from the intermediate body to the movable element, which would tend to tilt the movable element. Any tendency of the intermediate body to rotate is not transferred as a torque that tilts the movable element.

Or course a force is transferred to the movable element along the movement axis, this being necessary to drive movement. However, the decoupling between the intermediate body and the movable element also makes it simpler to design the apparatus to reduce any resultant tilt of the movable element. This may be achieved using the first aspect of the invention, or by some other technique, such as increasing the lateral stiffness of the flexures of the suspension system or arranging the actuator to apply an actuation force aligned along the movement axis with the centre of mass of the movable element.

Advantageously, the engagement of the intermediate body with the movable element is through a pivotal contact. This arrangement provides the desired pivoting in a way that is simple to manufacture. In the case of engagement being provided through such contact, the apparatus may be arranged with the flexures deformed to bias the movable element against the intermediate body.

The third aspect of the present invention is concerned with the provision of a biassing in an SMA actuation apparatus wherein the movable element is supported on the support structure by a suspension system comprising a plurality of resilient flexures Where a suspension system comprises a plurality of flexures, a perceived advantage is that the flexures also act as a biassing means providing a bias force in an opposite direction from the force applied by the SMA actuator on contraction. However, in fact benefits are achieved by providing the apparatus with a biassing element, in addition to the flexures, arranged to apply a biassing force to the movable element in the opposite direction along the movement axis to the actuation force. By use of such an additional biassing element, it is possible to pre-stress the SMA actuator, that is apply a high stress that must be overcome to commence movement. Such pre-stress raises the temperature at which the stress in the SMA material is sufficient to cause contraction against the biassing means. This is desirable to increase the range of ambient temperatures at which the apparatus is usable. However, such pre-stressing needs to be balanced against over design constraints, notably the range of movement achievable. The maximum movement achievable is constrained by the need to avoid a degree of deflection of the flexures which causes the material limits of the flexures to be exceeded.

The pre-stressing can also be increased by increasing the stiffness of the flexures. This increases the pre-stress force in the rest state. However, on deflection of the flexures it also causes the material limits of the flexures to be approached more quickly and so can indirectly reduce the range of movement.

In practice, the apparatus is designed to balance these various constraints. Such design is a straightforward task to perform, but it would be desirable to minimise the constraints discussed above in order to provide an apparatus having improved properties, for example a greater range of movement or a less constrained design of the flexures of the suspension system.

The third aspect of the present invention is concerned with the design of such a biassing element.

According to the third aspect of the present invention, there is provided a shape memory alloy actuation apparatus comprising:

a support structure;

a movable element;

a suspension system comprising a plurality of resilient flexures coupled between the support structure and the movable element to support the movable element on the support structure and to guide movement of the movable element along a movement axis by deflection of the flexures;

a shape memory alloy actuator arranged to apply an actuation force to the movable element in a first direction along the movement axis, on contraction of the shape memory alloy actuator; and a resilient biassing flexure arranged resiliently deformed in the shape memory alloy apparatus to apply a biassing force to the movable element in a second direction along the movement axis, opposite to the first direction, wherein the resilient biassing flexure is plastically deformed in a partial region thereof, and is arranged such that the resilient deformation is in an opposite sense from the plastic deformation.

Thus according to the third aspect of the invention, there is provided a biassing element, that is additional to the flexures of the suspension system, taking the form of a resilient biassing flexure arranged resiliently deformed to apply the biassing force. Specifically, the resilient biassing element is configured to be plastically deformed in a partial region thereof, the resilient deformation being an opposite sense.

Providing such plastic deformation in a partial region of the resilient biassing element provides an advantage associated with the build up of internal stresses caused by the plastic deformation process. During operation the resilient biassing element is also used at high stress. If the regions of these stresses coincide, it is possible for there to be some plasticity during use which effectively reduces the degree of plastic deformation, thereby reducing the load applied. By localising the plastic deformation in a partial region, it is possible to position it in a region separated from the regions of high stress during resilient deformation. This reduces the need to process the element during manufacture to increase robustness, for example by annealing.

Typically, the regions of high stress during resilient deformation are close to the ends of the resilient biassing element. Thus the partial region of plastic deformation is preferably separated from the ends, for example being within the central 75% of the length of the resilient biassing flexure between its ends.

Advantageously, the partial region of plastic deformation is relatively short, for example having a length of at most 10% of the length of the resilient biassing flexure between its ends. This makes it easier to control the manufacture of the resilient biassing element with sufficient precision.

The fourth aspect of the present invention is concerned with a design of an SMA actuation apparatus employing SMA wire that may be easily manufactured to a sufficient tolerance to provide precision control. A difficulty in assembling SMA wire into an apparatus is to correctly set the length and stress to provide the desired operating performance. In practical terms this requires difficult tolerances to be met.

Furthermore, it is difficult to make connections to SMA wire, both mechanically and electrically. This is largely due to the hard oxide coating on the wire, but also to the need to prevent damage to the wire during the joining process. Any micro-cracks will lead to premature failure of the SMA wire. On this basis a known manufacturing method is to crimp a crimping member to the SMA wire. The crimping member is used to mount the SMA wire in the apparatus and may also provide an electrical connection thereto. Although effective, care must still be taken with the crimping process to avoid wire damage.

However, even with the use of a crimping member, there remains a requirement to meet difficult tolerances in the coupling of the SMA wire into the apparatus for the reasons set out above.

According to the fourth aspect of the present invention, there is provided a shape memory alloy actuation apparatus comprising:

a support structure;

a movable element;

a suspension system arranged to support the movable element on the support structure and to guide movement of the movable element along a movement axis;

a shape memory alloy wire coupled between the support structure and the movable element and arranged to apply an actuation force to the movable element in a first direction along the movement axis on contraction of the shape memory alloy wire, the shape memory alloy wire being coupled to the support structure by a crimping member and a curved surface, the crimping member crimping the shape memory alloy wire and being fixed to the support structure holding the shape memory alloy wire against the curved surface from which the shape alloy memory wire extends to the movable element.

Thus, the SMA wire is coupled to the support structure not only by a crimping member that is fixed to the support structure, but also holding the SMA wire against the curved surface from which it extends to the movable element. This has been found to greatly reduce the required tolerances during manufature. Tolerances such as the exit angle of the SMA wire from the crimping member are less critical, and variations in the geometry of the crimping member will no longer affect the trigonometry of the SMA wire. Therefore, this improvement has advantages for manufacturing control.

All the aspects of the present invention may be applied to a movable element which is a camera lens element, the movement axis being the optical axis of the camera lens element. Particular advantage is achieved when applied to a miniature camera lens element comprising one or more lenses having a diameter of at most 10mm.

The various aspects of the invention and the features thereof may be used together in any combination.

An issue in an SMA apparatus in which the actuator is an SMA actuator and the suspension system comprises a plurality of flexures, is to design an apparatus to provide a desired range of movement. There are various variables and constraints, including the arrangement and properties of the SMA material, and the arrangement and properties of the flexures of the suspension system.

Where a suspension system comprises a plurality of flexures, a perceived advantage is that the flexures also act as a biassing means providing a bias force in an opposite direction from the force applied by the SMA actuator on contraction. Desirably, the apparatus is configured to require a relatively high stress to be developed in the SMA actuator to move the movable element away from the rest position in which the SMA actuator is unactivated. This may be achieved by means of providing an end-stop which limits the movement of the movable element in direction opposite to the direction of movement driven by contraction. The end-stop is positioned to pre-stress the biassing means, which stress must be overcome by the SMA actuator on activation to generate movement.

Such pre-stress is desirable for a number of reasons. Firstly this raises the temperature at which the stress in the SMA material is sufficient to cause contraction against the biassing means. This is desirable to increase the range of ambient temperatures at which the apparatus is usable. Secondly, in the rest state, the pre-stressing of the biassing means holds the movable element firmly against the end-stop. This is desirable to precisely control the position and prevent movement of the movable element caused by external forces.

However, such pre-stressing needs to be balanced against over design constraints, notably the range of movement achievable. The maximum movement achievable is constrained by the need to avoid a degree of deflection of the flexures which causes the material limits of the flexures to be exceeded.

The pre-stressing can be increased by moving the position of the end-stop. However, this directly reduces the range of movement.

The pre-stressing can also be increased by increasing the stiffness of the flexures. This increases the pre-stress force in the rest state. However, on deflection of the flexures it also causes the material limits of the flexures to be approached more quickly and so can indirectly reduce the range of movement.

In practice, the apparatus is designed to balance these various constraints. Such design is a straightforward task to perform, but it would be desirable to minimise the constraints discussed above in order to provide an apparatus having improved properties, for example a greater range of movement or a less constrained design of the flexures of the suspension system.

To deal with these issues, in any of the aspects of the present invention, the apparatus may be provided with a biassing element arranged to bias the movable element relative to the support structure in the second direction along the movement axis, the apparatus being arranged such that, when the moveable element is held against the end-stop, the force applied by the biassing element in said second direction is greater than the force applied by the resilient flexures of the suspension system.

By providing a biassing element in addition to the suspension system comprising a plurality of resilient flexures. This is contrary to the expectation, for example as taught in WO-2007/113478, that a suspension system comprising a plurality of resilient flexures has the benefit of itself acting as the biassing means. However, it has been appreciated that in fact there are benefits in providing an additional biassing element with a an arrangement in which, when the moveable element is held against the end-stop, the force applied by the biassing element is greater than the force applied by the flexures of the suspension system.

In particular, the additional biassing element provides the benefit of providing a relatively high pre-stress. That is, the biassing element applies a relatively high force which increases the force to be developed in the SMA actuator to move the movable element away from the rest position in which the SMA actuator is unactivated. Such pre-stress has the benefits discussed above.

However, as the additional biassing element does not suspend the movable element on the support structure and guide movement along the movement axis, the constraints on the design of the additional biassing element are greatly reduced. In particular, it is significantly easier to design the additional biassing element without exceeding the material limits. For example, if the additional biassing element is a flexure, it can have a length, as measured between the positions at which it is coupled to the support structure and the movable element, which is greater than the flexures of the suspension system.

This reduces the design constraints on the apparatus as a whole, allowing an improved design. For example, as compared to an equivalent apparatus without the additional biassing element, the maximum degree of movement may be increased and/or the constraints on the design of the flexures may be relaxed.

To allow better understanding, an embodiment of the present invention will now be described by way of non-limitative example with reference to the accompanying drawings, in which:

FIG. 16 is a graph of the resistance-length property of SMA during contraction.

There will first be described the structure of a camera 1 incorporating an SMA actuation apparatus. The camera 1 is to be incorporated in a portable electronic device such as a mobile telephone, media player or portable digital assistant.

Figure 1:
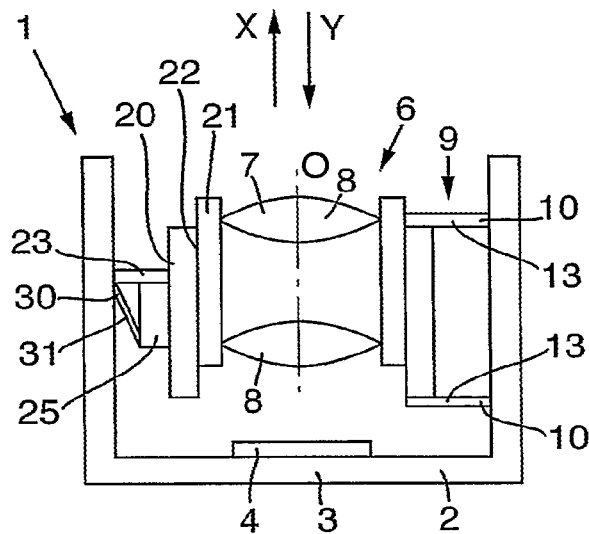
FIG. 1 is a schematic sectional view of a camera.

The camera 1 is shown schematically in FIG. 1 which is a schematic side view of the various functional components of the SMA actuation apparatus of the camera 1. The camera 1 comprises a support structure 2 which may be made of plastic. The support structure has a base portion 3 on which there is mounted an image sensor 4 having an array of light sensitive pixels. The image sensor 4 is typically packaged into a substrate, optionally with a protective cover glass or infrared (IR) filter. The image sensor may be a CCD (charge-coupled device) or a CMOS (complimentary metal-oxide-semiconductor) device. As viewed along the optical axis O, the base portion 3 is generally square and all the components of the camera 1 are within the footprint thereof.

The camera 1 further comprises a lens element 6 which holds a lens system 7 consisting of one or more lenses 8. By way of example, the lens system 7 is shown in FIG. 1 as consisting of two lenses 8 but in general there may be a single lens 8 or plural lenses 8 as needed to provide the desired balance of optical performance and low cost. The camera 1 is a miniature camera with the lenses 8 of the lens system 7 typically having a diameter of at most 10mm.

The lens element 6 is arranged with the optical axis O of the lens system 7 perpendicular to the image sensor 4. In this manner, the lens system 7 focuses light onto the image sensor 4. The basic principle of operation is that lens element 6 is moved along the optical axis O to change the position of the object focal plane focussed on the image sensor 4, the total range of movement achieved determining the range of focus available. The camera 1 is designed to minimise the tilt of the lens optical axis O over that range of movement.

The lens element 6 has a two-part construction comprising a lens carrier 20 and a lens holder 21 mounted inside the lens carrier 20 on an internal screw thread 22 formed inside the lens carrier 20. A typical diameter of the lens holder 21 is 6.5mm. The lens carrier 20 is connected to the suspension system 9 to suspend the lens element 6. The lens holder 21 mounts the one or more lenses 8 of the lens system 7. Both the lens carrier 20 and the lens holder 21 may be made from moulded plastic.

The lens element 6 is suspended on the support structure 2 by a suspension system 9 consisting of two suspension elements 10. As described further below, each suspension element 10 comprises two resilient flexures 13 coupled between the support structure 2 and the lens element 6, thereby supporting the lens element 6 on the support structure 2. The resilient flexures 13 deflect to guide movement of the lens element 6 along the optical axis O whilst resisting movement of the lens element 6 perpendicular to the optical axis O. An advantage of the use of resilient flexures 13 is that they provide relatively low friction resisting movement.

The camera 1 further comprises an SMA actuator 30 which comprises a piece of SMA wire 31 mechanically coupled to the support structure 2 and to the lens carrier 20 of the lens element 6, as described in more detail below. The SMA wire 31 is held in tension. On heating of the SMA wire 31, the SMA wire 31 contracts, driving movement of the lens element 6 in a first direction X along the optical axis O away from the image sensor 4. The lens element 6 is shown in FIG. 1 in its rest state in which the SMA actuator 30 is not active. In this state, the lens element 6 is in its closest position to the image sensor 4 within its range of movement, this position corresponds to far-field or hyperfocal focus, which is the most common setting for the camera 1, particularly if an auto-focus function is provided.

The camera 1 further comprises a biassing element 23 coupled between the support structure 2 and the lens element 6. As described in further detail below, the biassing element 23 comprises a resilient flexure which deflects on movement of the lens element 6 along the optical axis O. The biassing element 23 is always deflected in the first direction X so that it applies a force in a second, opposite direction Y, thereby acting as a biassing means against the force applied by the SMA actuator 30.

On heating of the SMA actuator 30 the stress therein increases until it overcomes the biassing element 23 and the flexures 13. The SMA wire 31 contracts moving the lens element 6 away from the image sensor 4. The lens element 6 moves over a range of movement as the temperature of the SMA wire 31 increases over the range of temperature in which the transition of the material of the SMA wire from the Martensite phase to the Austenite phase. Conversely, on cooling of the SMA wire 31 so that the stress therein decreases, the biassing provided by the biassing element 23 and the flexures 13 causes the SMA wire 31 to expand moving the lens element 6 towards the image sensor 4.

In FIG. 1, the suspension system 9 and the combination of the SMA actuator 30 and the biassing element 23 are shown schematically on opposite sides of the camera 1 to assist understanding of their function, but in fact these components extend around the camera 1.

The construction of the camera 1 will now be described in detail, with reference to FIGS. 2 to 13. A key desire for the camera 1 is to minimise size, and it is designed to be packaged within a given space which is square as viewed along the optical axis O. Within this constraint, the camera 1 is designed to provide the largest possible range of movement of the lens element 6 and the largest possible diameter of the lens system 7. At the same time, the camera 1 is designed to keep the tilt of the lens element 6 over its range of movement within a desired limit appropriate to the optical parameters of the lens system 7. Parasitic movements perpendicular to the optical axis O are undesirable, but less critical if relatively small in magnitude.

Figure 2:
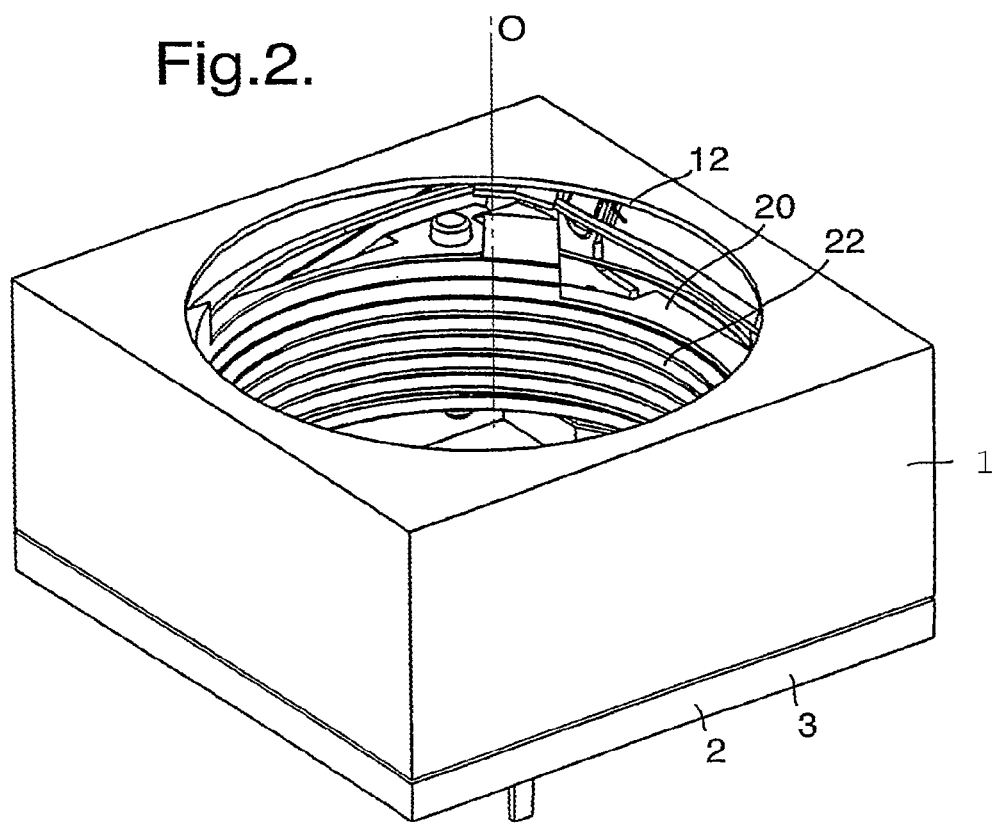
FIG. 2 is a perspective view of the camera.

FIG. 2 is a perspective view of the camera 1 including a cover 11 which attaches to the base 3 of the support structure 2 to protect the other components and has an aperture 12 aligned with the optical axis O through which incident light enters. In FIG. 2 (and subsequent drawings), the lens holder 21 is omitted to avoid obscuring other components, but the lens carrier 20 and internal screw thread 22 are visible.

Figure 3:
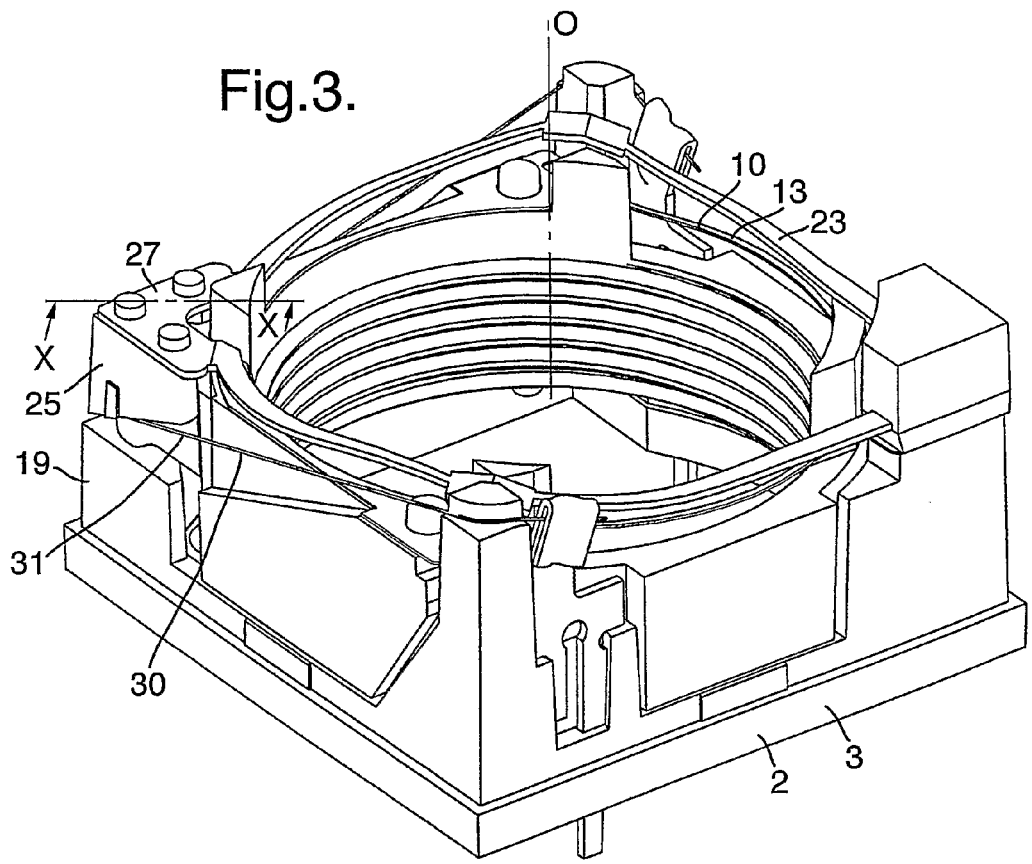
FIG. 3 is a perspective view of the camera with a cover removed.

FIG. 3 is a perspective view of the camera 1 with the cover 11 omitted to show the overall arrangement of one of the suspension elements 10, the SMA actuator 30 and the biassing element 23.

Figure 4:
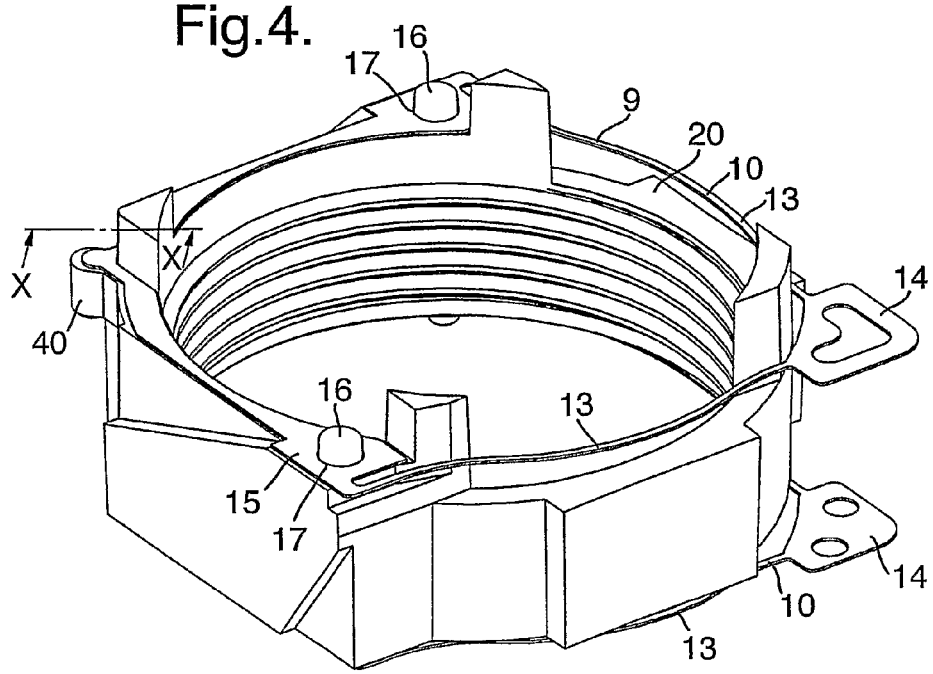
FIG. 4 is a perspective view of a suspension system of the camera.
Figure 5:
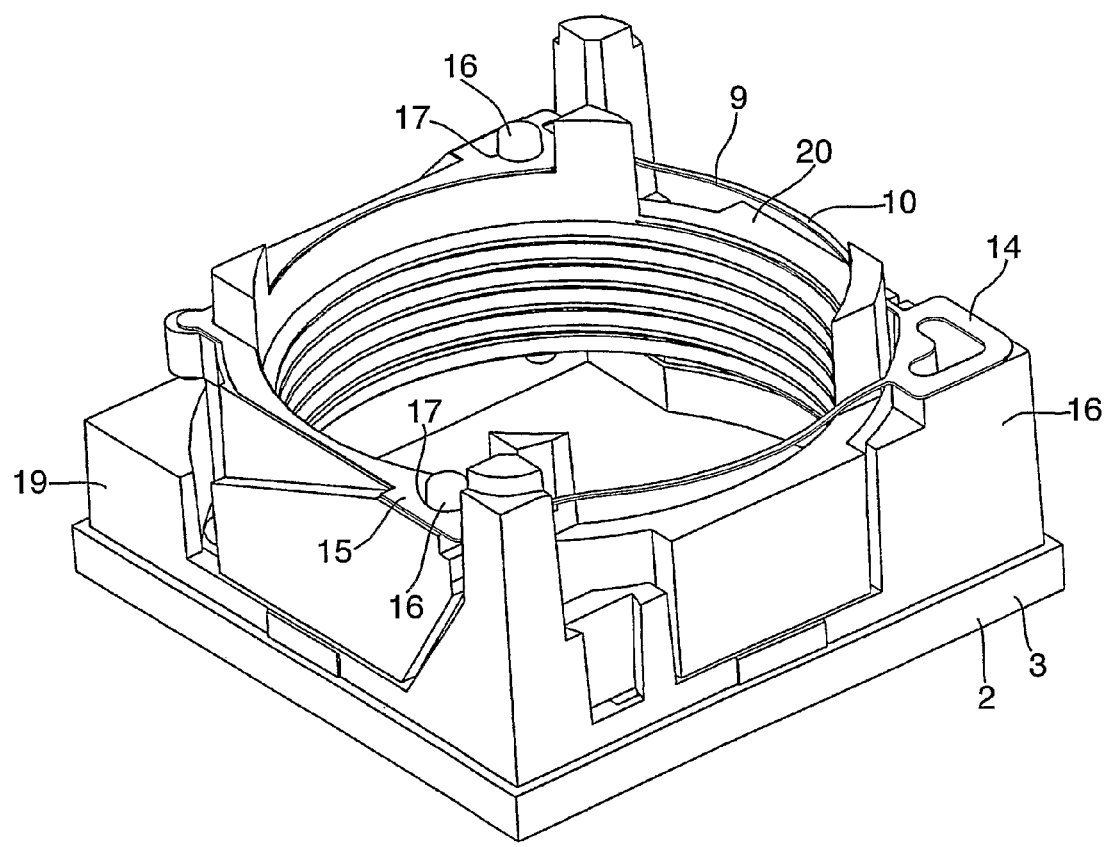
FIG. 5 is a perspective view of the suspension system together with a support structure of the camera.

Now, the suspension system 9 will be described with reference to FIG. 4 which shows the suspension system 9 and lens holder 20 in isolation, and to FIG. 5 which shows the same components together with the support structure 2.

The suspension system 9 has the primary purpose of supporting the lens holder 20 and hence the lens element 6 as a whole on the support 2 and guiding movement thereof along the optical axis O whilst limiting tilt thereof. The suspension system 9 comprises the two suspension elements 10 which have a similar configuration each comprising a pair of flexures 13. Each suspension element 10 is formed from a single sheet of material such as steel or beryllium copper cut into shape. One possibility is hard rolled grade 302 austenitic steel which has the advantage of providing a high yield stress.

Within each suspension element 10, the flexures 13 each extend from a common support portion 14 to a common lens portion 15. To couple the flexures 13 to the support structure 2, the support portion 14 of each suspension element 9 is fixed to a block 16 which is an integral part of the support structure 2 protruding upwardly from the base portion 3 in one corner thereof. To couple the flexures 13 to the lens element 6, the lens portion 15 is fixed to the end of the lens holder 20. In particular the lens portion 15 is an arcuate strip which extends around the end surface of the lens holder 20, held in place by two studs 16 that extend from the end surface of the lens holder 20 through corresponding apertures 17 in the lens portion 15. This is shown in respect of the upper suspension element 9 in FIGS. 4 and 5, the lower suspension element 9 having the same configuration although not visible.

In each suspension element 9, the two flexures 13 extend around the optical axis O and are 5 arranged with mirror symmetry about a notional plane disposed between the flexures 13 and containing the optical axis O Due to this configuration of the suspension elements 10, the flexures 13 accommodate movement of the lens element 6 relative to the support structure 2 along the optical axis O by resilient flexing or bending. As the flexures 13 have a thickness parallel to the optical axis O which is smaller than their width, the flexures 13 are more compliant to bending in their thickness direction than to bending in their width direction, thereby providing the suspension system 9 with a lower degree of stiffness against movement of the lens element 6 along the optical axis O, than perpendicular to the optical axis O. Furthermore, as the two suspension elements 10 are spaced apart along the optical axis O, the resistance to movement of the lens element 6 perpendicular to the optical axis O also provides resistance to tilting of the lens element 6.

Although the overall configuration of the two suspension elements 10 is the same, as described above, the flexures 13 of the two suspension elements 10 are non-uniformly configured to have different lengths and resilient deflections, as described further below.

The individual flexures 13 extending between the support portion 14 and the lens portion 15 have three arcuate regions as viewed along the optical axis. This is the same structure, and used for the same reasons, as the corresponding flexures of the camera disclosed in WO 2007/113478, to which reference is made and which is incorporated herein by reference.

Figure 6:
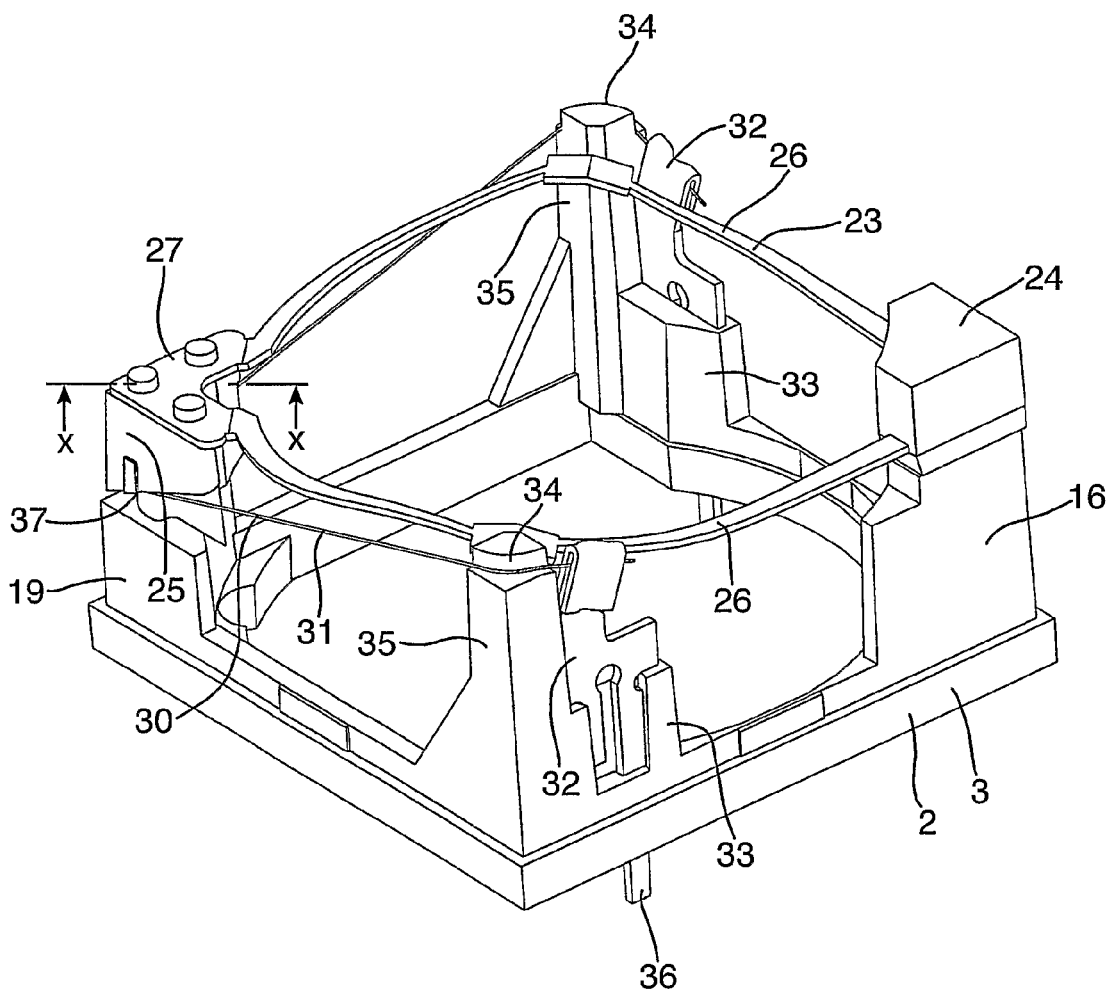
FIG. 6 is a perspective view of the camera with the suspension system and lens element omitted.

Now, the SMA actuator 30 and the biassing element 23 will be described with reference to FIG. 6 which shows these components together with the support structure but with the suspension system 9 omitted for clarity.

The primary purpose of the SMA actuator 30 is to apply an actuation force along the optical axis O for driving movement of the lens element 6. The primary purpose of the biassing element 23 is to provide a biassing force in an opposite direction along the optical axis. The biassing element 23 accounts for the majority of the load applied to the SMA actuator 30 in the direction of the desired movement along the optical axis. The biassing element 23 is thus designed to ensure the SMA actuator 30 is operating in the appropriate mechanical stress and strain regions. In this camera 1, the biassing element 23 also resists undesired movement in lateral directions.

In particular, the SMA actuator 30 and the biassing element 23 are each coupled to an intermediate body 25 which in turn engages the lens holder 20, the intermediate body 25 being disposed above a corner of the base portion 3 of the support structure 2 opposite to the block 16 that mounts the suspension elements 10.

The SMA actuator 30 is arranged as follows.

Making connections to SMA wire 31, both mechanically and electrically is difficult. This is largely due to the hard oxide coating on the wire, but also due to the need to ensure the SMA wire 31 is not damaged during the joining process. Any micro cracks will lead to premature failure of the SMA wire. On this basis the manufacturing method of choice is for the piece of SMA wire 31 to be mechanically and electrically connected at each end to a respective crimping member 32, each formed as an elongate piece of metal for example brass.

The joining process of choice is to crimp the crimping members 32 over the piece of SMA wire 31. In this way the crimping process breaks through the oxide coating which forms naturally over the SMA wire 31 to form good electrical contact, and an airtight seal around the joint. Care must be taken with the crimping process to avoid wire damage. During manufacture of the SMA actuator 30 the oxide coating may be removed before crimping.

Other potential joining methods include welding and soldering. However, both have substantial process development problems. Soldering requires very aggressive fluxes to remove the oxide coating, and welding, requires material matching, and the avoidance of a heat affected zone, which alters the microstructure of the SMA wire. In the future, the welding process in particular may offer manufacturing cost advantages.

Each crimping member 32 is received in and fixed to a socket portion 33 formed as an integral part of the support structure 33. The crimping members 32 each also have a contact portion 36 which protrudes therefrom.

In addition, the SMA wire 31 is held by the crimping members against curved surfaces 34 formed on posts 35 protruding from opposite corners of the base portion 3 of the support structure 3 on either side of the intermediate body 25. The curved surfaces 34 thus assist in coupling the SMA wire 31 to the support structure and in particular fix the position of the ends of the SMA wire 31. This has been found to greatly reduce the required tolerances during manufacture, as compared to arranging the SMA wire 31 to extend directly from a crimping member 32. Tolerances such as the exit angle of the SMA wire 31 from the crimping member 32 are less critical, and variations in the geometry of the crimping member 32 will no longer affect the trigonometry of the SMA wire 31. Therefore, this improvement has advantages for manufacturing control.

The SMA wire 31 is configured with mirror symmetry about a notional plane extending parallel to the optical axis between the portions of the SMA wire 31 on each side of the intermediate body 25. In this manner forces perpendicular to that notional plane are balanced.

This configuration employing the curved surface 34 provides further advantages as follows. Firstly, it allows the active length of the SMA wire 31 along each side of the camera 1 to be maximised within the packaging constraint of the square base portion 3, as there is no requirement to accommodate the width of the crimping member 32, or clearances between the crimping member 32 and the cover 11. The limiting factor on the active length becomes the minimum bend radius of the curved surface 34 to avoid micro cracks in the SMA wire 31. Secondly, this configuration is very convenient as there is space available given the geometry of the flexures 13, the length of which is desirably maximised to minimise the axial stiffness and the stresses induced during impact. If the crimping member 32 were positioned on the same sides of the camera 1 as the SMA wire 31, this would limit the length of the flexures 13. It can also be seen that the curved nature of the flexures 13 provides a convenient space for locating the crimping member 32.

The SMA wire 31 intermediate the curved surfaces 34 is hooked over the intermediate body 25, in particular sitting in a notch 37 in the intermediate body 25 that is curved to reduce the maximum curvature of the SMA wire 31. In this manner the SMA wire 31 is coupled to the intermediate body 25. Thus the SMA wire 31 is configured with each portion thereof on either side of the intermediate body 25 extending at an angle to the optical axis O. Thus, on contraction of the SMA wire 31 on heating, the SMA wire applies a component of force along the optical axis O away from the image sensor 4 as an actuation force.

The degree of displacement of the lens element 6 relative to the support structure 2 along the optical axis O is dependent on the stress developed within the SMA wire 31 and also on the acute angle of the lengths 35 of SMA wire 31 with respect to the optical axis O. The strain which may be developed in an SMA wire is limited by the physical phenomenon of the phase change. Due to the acute angles of the lengths 35 of SMA wire 31 with respect to the optical axis O, the lengths 35 of the SMA wire change in orientation when they change in length. This effectively gears the movement so that the degree of displacement of the lens element 6 along the optical axis O is higher than the change in length of the lengths 35 of SMA resolved along the optical axis O. In general the acute angle may take any value but is approximately 70° in this example.

The biassing element 23 is crucial to the successful use of the SMA wire 31, and to the delivery of the correct displacements and loads to the lens element 6. In order for the camera to be fully functional up to 70° C., the phase transition temperatures of the material of the SMA wire 31 must be above 70° C. In order to achieve this, the mechanical stresses in the SMA wire 31 must be relatively high, as the mechanical stresses affect and control the transition temperatures. In contrast, if the stress in the SMA wire 31 is too high this causes progressive plasticity and fatigue of the wire during use. Therefore the ideal is to operate the SMA wire 31 at a high stress, which is as close to constant as possible over the displacement range to avoid over stressing of the SMA wire 31. This means that there is a relatively narrow region of successful operation to achieve both the requirements for operating at high temperature and for a given lifetime. Likewise the operating strain range needs to be tightly controlled and minimised as this also affects the lifetime of the SMA wire 31. The biassing element 23 is instrumental in setting up the appropriate stress and strain cycles of the SMA wire 31 being formed so that throughout the range of travel there is significant and appropriate pre-load of the SMA wire 31 to generate appropriately high stresses, whilst minimising the variation in stress across the range of travel.

Additionally, in this camera 1, the biassing element 23 also resists the substantial component of force generated by the SMA wire 31 on contraction in a direction perpendicular to the optical axis O with high stiffness, whilst having a much lower stiffness to movements along the optical axis O. In this manner the biassing element 23 turns the strain of the SMA wire 31 into displacement along the optical axis O, whilst minimising parasitic displacements and tilts perpendicular to the optical axis O. Therefore the biassing element 23 aids the delivery of the mechanical advantage to amplify the strain of the SMA wire 31.

The biassing element 23 is arranged as follows.

Figure 7:
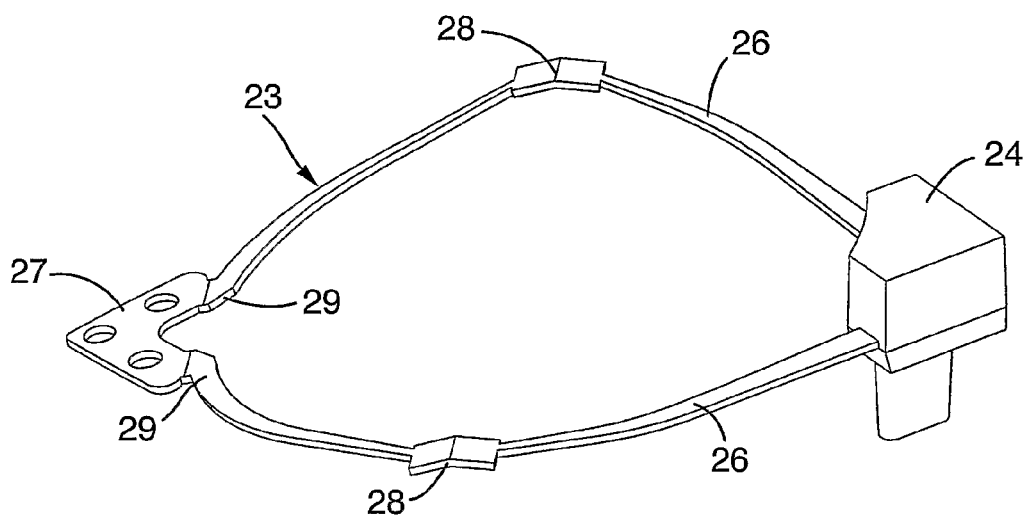
FIG. 7 is a perspective view of a biassing element of the camera.

As shown in FIG. 7, the biassing element 23 is formed as a resilient flexure from a respective single sheet of material such as steel or beryllium copper, having a high yield stress and cut, stamped or etched into shape.

At one end, the biassing element 23 has a mount 24 which is formed as a block of material fixed to the biassing element 23, for example by being moulded by outsert injection moulding. The mount 24 is fixed to the block 16 to couple the biassing element to the support structure 2 in the same corner as the suspension elements 10.

The biassing element 23 has two arms 26 each extending from the mount 24 and joined together at their opposite ends by a mounting portion 27 formed integrally with the arms 25. The mounting portion 27 is fixed to the intermediate body 25 to couple the biassing element 23 thereto.

As viewed along the optical axis O, the arms 26 are curved so that the biassing element 23 is annular overall extending around the optical axis O. Such curvature of the arms 26 maintains the arms 26 outside the field of view of the lens element 6 to avoid obstructing imaging on the image sensor 4.

Figure 8:
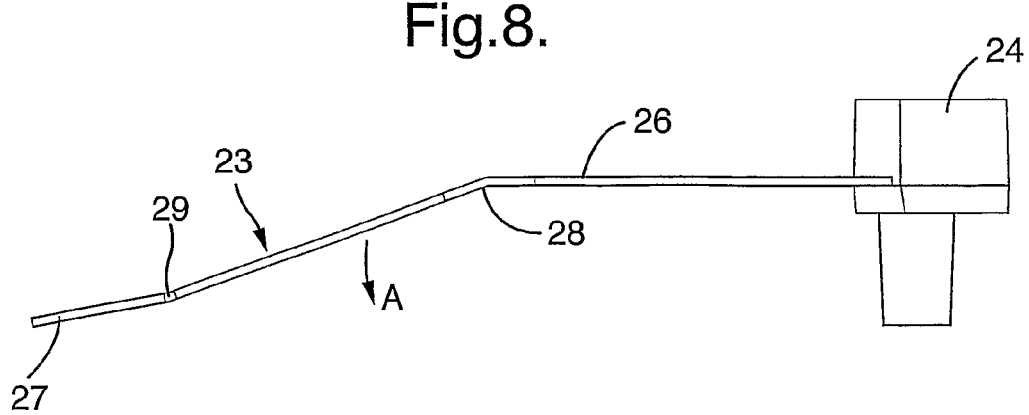
FIG. 8 is a side view of the biassing element in a relaxed state

To achieve the desired degree of stress to the SMA wire 31, the biassing element 23 is plastically deformed during manufacture as shown in FIG. 8 which shows the biassing element 23 in its relaxed state. In particular the biassing element 23 is plastically deformed in a main partial region 28 of the biassing element 23, in a downwards direction A in FIG. 8. There is also a smaller degree of plastic deformation in a further partial region 29 adjacent the mounting portion 27.

As assembled into the camera 1, the biasing element 23 is elastically deformed to apply the required stress to the SMA wire 31. In particular, the support structure 2 has an end-stop 19 formed integrally therewith in the same corner as the intermediate body 25. When the SMA wire 31 is not contracted, in its unheated state, the end-stop 19 contacts the intermediate body 25 limiting the movement towards the image sensor 4. This elastically deforms the biasing element 23 in the direction in which the SMA wire 31 applies an actuation force, creating a pre-stress which must be overcome by the SMA actuator 30 to generate movement.

Figure 9:
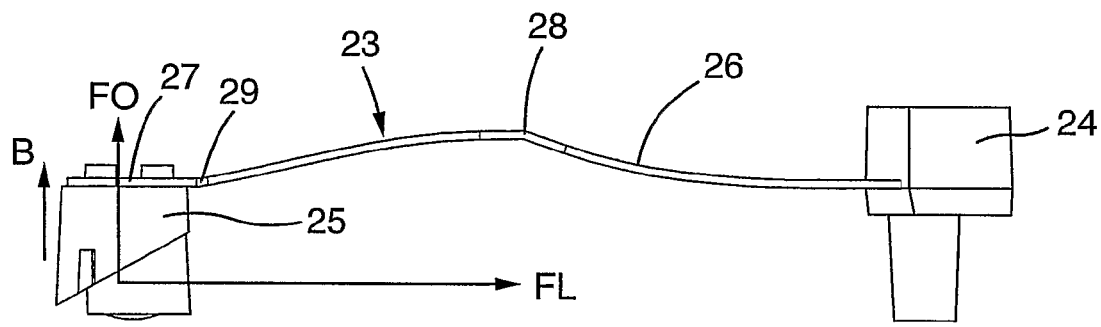
FIG. 9 is a side view of the biassing element in its elastically deformed state in the camera.
Figure 10:
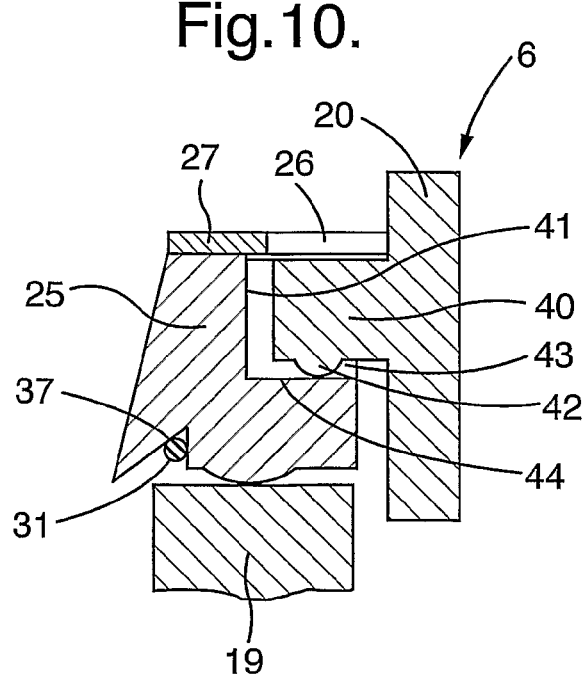
FIG. 10 is a cross-sectional view of a part of the camera taken along line X-X in FIGS. 1, 3, 4 and 6.

FIG. 9 shows the biasing element 23 in the state in which the SMA actuator 30 is not contracted, elastically deformed in an upwards direction B in FIG. 9. The force applied to the biasing element 23 may be resolved into a component FO along the optical axis O and a component FL perpendicular to the optical axis, both of these components FO and FL being resisted by the elastic deformation of the biasing element 23.

It can also be seen that the plastic deformation of the biasing element 23 in the main partial region 28 is in an opposite sense to the elastic deformation of the biasing element 23 assembled into the camera 1. This provides the advantage associated with the build up of internal stresses. The plastic deformation process sets up internal stresses. During operation the material is also used at high stress. If the regions of these stresses coincide, it is possible for there to be some plasticity during use which degrades the degree of plastic deformation to a degree and reduces the pre-stress. However, by localising the plastic deformation in the main partial region 28, and also the further partial region 29, the plastic deformation is kept away from the regions of high elastic deformation, thereby reducing the degradation. This reduces the need to process the biasing element 23 to increase its robustness, for example by annealing, although optionally such annealing may be performed.

To improve this effect, the main partial region 28, that is plastically deformed in an opposite sense to the elastic deformation on assembly, is desirably separated from the ends of the biasing element 23 and in particular away from the mount 24 which is fixed, typically being within the central 75% of the length of the resilient biasing element 23. For example, in the specific example illustrated, the main partial region 28 is approximately in the centre of the biasing element 23.

To further improve this effect, the main partial region 28, and also the further partial region 29, are desirably short, typically having a length of at most 10% of the length of the biasing element 23. For example, in the specific example illustrated, the main partial region 28 and the further partial region 29 each have a length of approximately 1% of the length of the biasing element 23. The concentrated plastic deformation is also easier to control and measure in manufacture.

An additional point is that the biasing element 23 is widened in the vicinity of the partial region 28. This further lower the stresses developed elastically and hence reduces the degradation of the plastic deformation during use.

As can be seen in FIG. 9, the biasing element 23 is designed so that in the assembled camera 1 the mounting portion 27 is approximately parallel with the end of the biasing element 23 fixed to the mount 24. This is achieved primarily by the change in orientation of the mounting portion 27 caused by the plastic deformation in the main partial region 28 being compensated by the change in orientation of the mounting portion caused by the elastic deformation in the assembled state, but with the mismatch between these two effects being corrected by the plastic deformation in the further partial region 29. In other words, the biasing element 23 is designed to have a degree of plastic and elastic deformation that provides the appropriate pre-stress in the SMA wire 30, and also achieves a flat orientation of the mounting portion 27 when assembled.

As a result of this, the movement of the intermediate body 25 under the influence of the contraction of the SMA wire 3 and the resistance of the biasing element 23 is primarily along the optical axis O and with relatively low tilt over the range of travel. The low degree of tilt can also be understood on the basis that, as can be qualitatively seen from FIG. 9, the two resolved components of force FO and FL apply moments to the biasing element 23 in opposite senses. This low tilt of the biasing element 23 is advantageous because it reduces the resultant force developed perpendicular to the optical axis throughout the range of travel so that the position and loads delivered do not alter.

In summary, the biasing element 23, besides providing a biasing force along the optical axis O against the actuation force developed on contraction of the SMA wire 30 corresponding to the component FO, also resists the component FL developed by the SMA wire 30 perpendicular to the optical axis O. In addition, the biasing element 23 accommodates and guides the motion along the optical axis O with a relatively low tilt of the mounting portion 27 at of the moving end, thereby aiding the control of the SMA wire 30 geometry (trigonometry), and the stability of the load application to the lens element 6.

As discussed above, the SMA actuator 30 and the biasing element 23 are each coupled to an intermediate body 25 which in turn engages the lens holder 20. The nature of that engagement will now be described with reference to FIG. 10 which shows the relevant part of the camera 1 in the state in which the SMA actuator 30 is not contracted so that the intermediate body 25 is held against the end-stop 19 by the biasing element 23.

The lens holder 20 has an integrally formed shoulder 40 that extends laterally into a recess 41 formed in the intermediate body 25. The shoulder 40 has, on its lower surface facing the intermediate body 25 along the optical axis O, a protrusion 42 having a curved outer surface 43 that contacts a flat surface 44 of the recess. The shapes of surfaces 43 and 44 provide a pivotal contact between the intermediate body 25 and the lens holder 20 of the lens element 6. Of course, such a pivotal contact could alternatively be provided by differently shaped surfaces.

Due to the pivotal contact, the intermediate body 25 engages the lens element 6 in a manner providing for transfer of force along the optical axis O, in particular of the actuation force generated by contraction of the SMA wire 31 to drive movement of the lens element 6 along the optical axis O, whilst allowing pivoting of the intermediate body 25 with respect to the lens element 6. This effectively decouples the intermediate body 25 from the lens element 6 to reduce the transfer of forces perpendicular to the optical axis O that would tend to tilt the lens element 6. Although the tilt of the intermediate body 25 is minimised as described above, any remaining tendency to rotate does not result in transfer of a torque which may tilt the lens element 6.

Due to the engagement between the intermediate body 25 and the lens element 6 being through a pivotal contact, transfer of force can only occur in one direction. Accordingly, in the assembled camera 1, the flexures 13 of the suspension system 9 are elastically deformed to load the lens element 6 against the intermediate body 25 and prevent loss of the pivotal contact during normal operation. Essentially this means that the flexures 13 are arranged with an appropriate axial stiffness and pre-deflection to apply a force which is greater than the weight of the lens element 6 to prevent gravity from separating the lens element 6 from the intermediate element 25 when the camera 1 is oriented with the lens element 6 facing downwards. Although the camera 1 is designed with some margin between these forces, loss of contact may be temporarily allowed when the camera 1 experiences unusually high impact forces, such as when the module is dropped.

In order to successfully carry out this function and meet a typical reliability specification, the flexures 13 are designed to be capable of appropriate elastic deformation, particularly in directions perpendicular to the optical axis O. This is to ensure that the flexures 13 can still deliver their primary functions after impact conditions in which the lens element 6 moves relative to the support structure 2 in arbitrary directions until retarded by the movement end-stops built into the camera 1, e.g. arranged between the lens element 6 and the support structure 2. This robustness requirement has a substantial influence on design of the flexures 13 in order to balance the need to be stiff perpendicular to the optical axis O to resist tilt, but to accommodate lateral movements elastically to prevent damage during impact.

The biassing element 23, on the other hand, is much easier to design without material limits being exceeded, even though the biassing element 23 has a significant stiffness. This is because the design of the biassing element 23 is not constrained in the same manner as the suspension system 9 because the biassing element 23 does not have the function of supporting and guiding movement of the lens element 6. Thus in the camera 1 the biassing element 23 has a length, as measured between the positions at which it is coupled to the support structure 2 and the lens element 6 which is greater than that of the flexures 13 of the suspension system 9. As the stiffness of a flexure scales with the cube of its length, this means that as compared to the flexures 13 it is easier to design the biassing element 23 with high stiffness but without exceeding material limits. Although the biassing element 23 could optionally be designed with shorter arms 26, desirably in order to maintain the length the arms 24 extend a significant angle around the optical axis O, for example at least 135.

It should be noted that the flexures 13 do contribute a proportion of the pre-load stress in the SMA wire 30 along the optical axis O. This is an inevitable, but parasitic effect accounted for in the design of the biassing element 23.

Furthermore, the provision of the biassing element 23 reduces the design constraints on the camera 1 as compared to a notional design in which the biassing force was provided only by the resilient deformation of the flexures 13, as follows.

Figure 11:
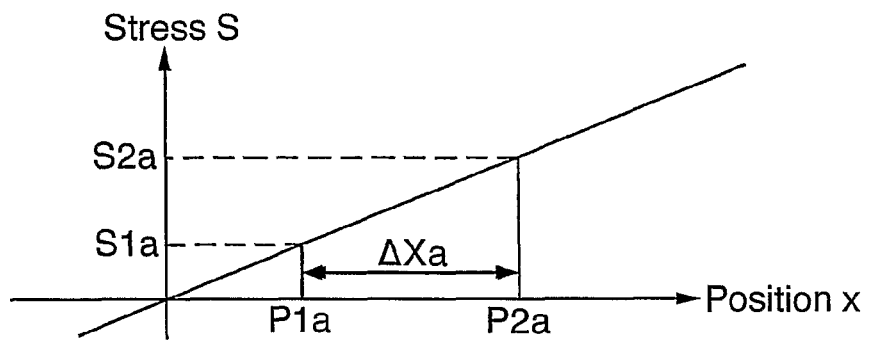
FIG. 11 is a graph of stress developed against position of a lens element in a comparative example.

By way of comparative example, FIG. 11 is a graph of the stress S developed in the suspension system 9, and therefore also the SMA actuator 30, at different positions x of the lens element 6 in an equivalent apparatus in which the biassing element 23 is omitted, as for example in the apparatus disclosed in WO-2007/113478. The position x is measured in the first direction X. The positions P1$a$ and P2$a$ are the ends of the range of movement Δxa of the lens element 6.

The position P1$a$ of lens element 6 in its rest state is fixed by the end-stop 19 and is selected to pre-stress the suspension system 9 to a stress S1$a$ that is therefore the stress which needs to be developed in the SMA actuator 30 to start movement of the lens element 6. This pre-stress is designed to be sufficiently high to achieve two effects. Firstly, as the pre-stress raises the temperature at which the stress in the SMA actuator 30 is sufficient to cause contraction against the biassing element 23, the pre-stress is selected having regard to the desired range of ambient temperatures at which the camera 1 is to operate. Secondly, the pre-stress is selected to hold the lens element 6 firmly against the end-stop 19 for the purposes of precisely controlling the position and preventing movement of the lens element 6 caused by external forces.

The position P2$a$ is the position of the lens element 6 when the SMA actuator 30 is fully contracted and is therefore dependent on the configuration of the SMA actuator 30. At this position P2$a$, a stress S2$a$ is developed. The position P2$a$ is selected so that at this position P2$a$ the material limits of the flexures 13 of the suspension system 9 are not exceeded.

Figure 12:
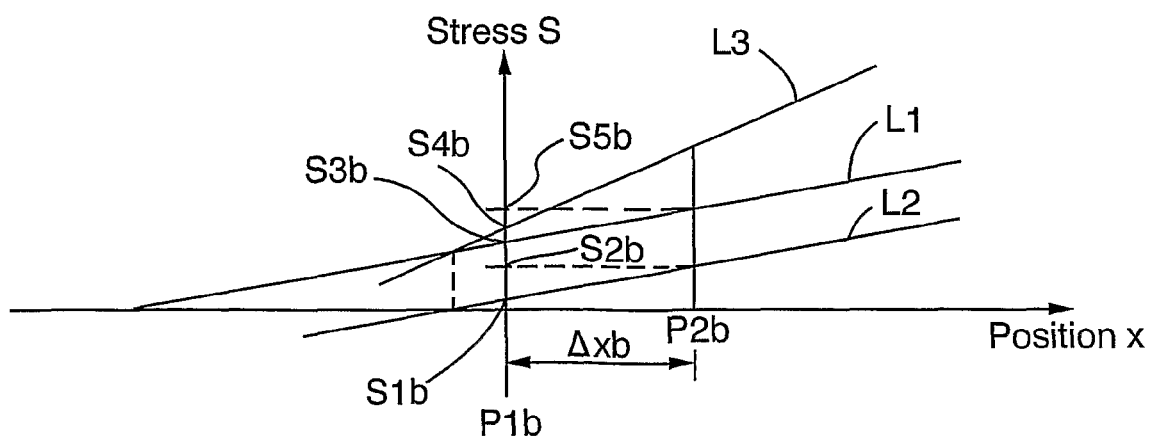
FIG. 12 is a graph of stress developed against position of the lens element in the camera of 10 FIG. 1.

FIG. 12 shows an equivalent graph of the stress S developed at different positions x of the 20 lens element 6 in the camera 1. In particular line L1 is the stress developed in the biassing element 23, line L2 is the stress developed in the suspension system 9, and line L3 is the total stress developed in the biassing element 23 and the suspension system 9 together which is therefore the stress developed in the SMA actuator 30. The positions P1$b$ and P2$b$ are the ends of the range of movement Δxb of the lens element 6.

In this example, the position P1$b$ of the end-stop 19 is selected so that in the rest position of the lens element 6, the suspension system 9 is deflected but to a relatively small degree such that it develops a stress S1$b$ less than the stress S3$b$ developed in the biassing element 23, the total stress S4$b$(=S1$b$+S3$b$) has the same value S1$a$ as at the rest position in the comparative example of FIG. 11. This stress S4$b$(=S1$a$) is therefore the stress to be developed in the SMA actuator 30 to start movement of the lens element 6 and is selected on the basis described above.

The position P2$b$ is the position of the lens element 6 when the SMA actuator 30 is fully contracted and is therefore dependent on the configuration of the SMA actuator 30. The SMA actuator 30 is configured so that at this position P2$b$, the stress S5$b$ developed in the biassing element 23, and the stress S2$b$ developed in the suspension system 9 do not exceed the material limits of the biassing element 23 and flexures 13 of the suspension system 9. Compared to the comparative example of FIG. 11, the constraints on the design of the flexures 13 is greatly reduced. Firstly, it is not necessary for the suspension system 9 to provide all the stiffness necessary to bias the SMA actuator 30, this being provided predominantly by the biassing element 23. Secondly, it is possible to operate the flexures 13 at lower degrees of deflection. Thus, in the specific example of FIG. 12, the camera 1 provides a higher range of movement Δxb than the range of movement Δxa in the comparative example of FIG. 11, whilst providing a lower stress S2$b$ in the suspension system 9 than the stress S2$a$ in the comparative example of FIG. 11.

As an alternative to a use of a pivotal contact, the intermediate body 25 may in principle engage the lens element 6 in any alternative way that allows pivoting, for example a pivoting joint. A suitably designed joint would have the benefit of not requiring the flexures 13 to hold the lens element 6 against the intermediate body 25, but would have the disadvantages of requiring high tolerance in the positioning of the joint and transferring lateral force on any residual sideways movement of the intermediate body 25.

Although the pivotal contact reduces the application of lateral forces to the lens element, of course an actuation force is necessarily applied to the lens element 6 along the optical axis O. However, as the shoulder 40 is arranged in one corner of the camera 1, this actuation force is applied at position displaced from the optical axis O. This is principally due to the need to arrange the SMA wire 31 without optically obstructing the lens system 7. Thus the actuation force applies a moment around the centre of mass of the lens element 6 which is typically on or close to the optical axis due to the generally symmetrical arrangement of the lens element 6 around the optical axis O. This moment will tend to tilt the lens element 6.

Figure 13:
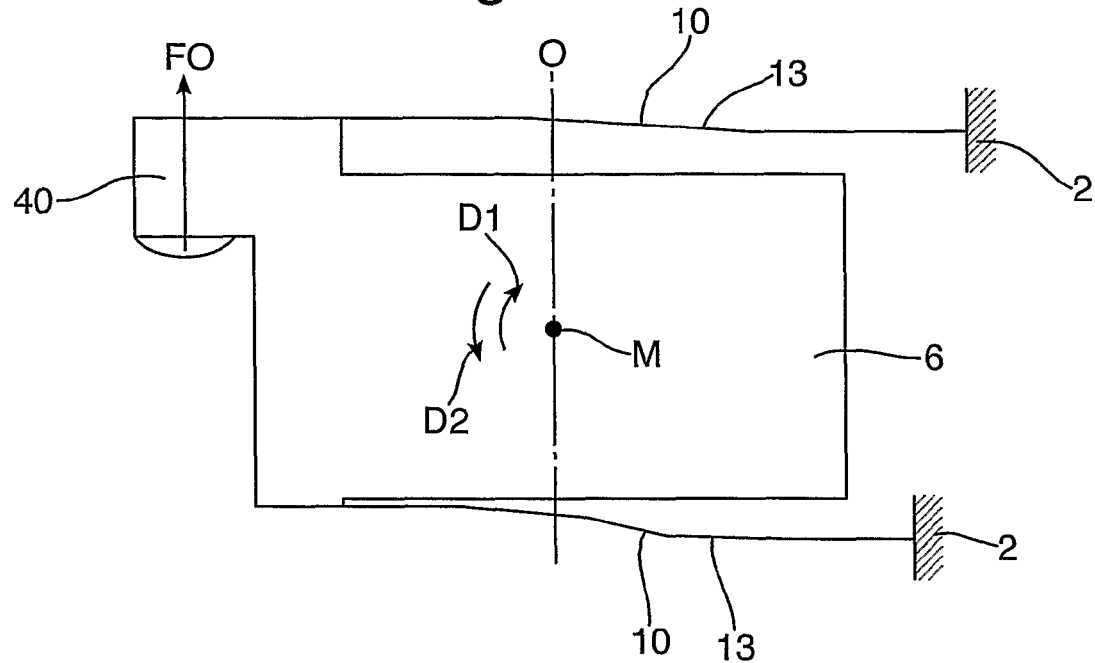
FIG. 13 is a schematic side view of the lens element and suspension system of the camera.

The suspension system 9 is designed to combat this tendency by the two suspension elements 10 being non-uniformly configured as will now be described with reference to FIG. 13 which schematically illustrates the lens element 6 supported on the support structure 2 by the two suspension elements 10, the actuation force FO being displaced from the optical axis and applying a moment around the centre of mass M of the lens element 6 in a first sense D1.

The two flexures 10 have a similar overall configuration, as described above, but are non-uniformly configured by their flexures 13 having different lengths and being deflected by different amounts in the assembled camera 1, at any given position of the lens element 6. In this example, the flexures 13 of the upper suspension element 10 is longer but deflected by a smaller amount than the flexures 13 of the lower suspension element 10. As a result of this non-uniform configuration, the two suspension elements 10, on deflection to a given position along the optical axis, generate a net moment around the centre of mass M in a sense D2 which is opposite to the sense D1 of the moment generated by the actuation force FO. This may be understood by considering the geometry of the flexures 13 of the two suspension elements 10. The different lengths and deflections mean that the upper suspension element 10 generates a component of lateral force to the left in FIG. 13 and the lower suspension element 10 generates a component of lateral force to the right in FIG. 13, creating a net moment about the centre of mass M. This net moment resists, and ideally balances, the moment generated by the actuation force FO and hence reduces, and ideally eliminates tilt of the lens element 6. In an actual embodiment of the camera 1, tilt of the lens element 6 has been reduced to size of order 0.03° over the range of travel of the lens element 6.

In the general case, either or both of the length and deflection of the flexures 13 may be designed to generate the moment, although in this example the difference in deflection is the more significant factor. The smaller length of the flexures of the lower suspension element 10 also improves the packaging, as there is less space available due to the presence of the components of the support structure 2 close to the base portion 3.

To achieve this effect, the pair of flexures 13 of each suspension element 10 are arranged with mirror symmetry about a notional plane perpendicular to the moment around the centre of mass M generated by the actuation force FO. This is due to the arrangement of the support portions 14 of each suspension element 10 on the opposite corner of the camera 1 from the shoulder 40 which receives the actuation force FO, noting that the centre of mass M is located on the optical axis O. This mirror symmetry also means that the force generated by each pair of flexures 13 is balanced in directions perpendicular to that notional plane. This arrangement is also beneficial from a packaging point of view to maximise clearances.

Also, during movement, there is no rotation of the lens element 6 around the optical axis O. Although such a rotation is unimportant optically, it causes a tendency to make the loads in the SMA wire 30 and the apparatus as a whole asymmetric, which may worsen tilt and degrade the performance of the SMA wire 30.

There is a further potential advantage to this arrangement of splitting the functions spatially for certain embodiments of the present invention (although not the one illustrated), in that the SMA wire 30 and the biassing element 30 may be fitted to the support structure 2 before the lens element 6 and suspension system 9, hence providing a testable actuator sub-assembly. Likewise the lens element 6 and suspension system 9 could also be separately assembled and tested before these two sub-assemblies are assembled together. Since the flexures 13 are not joined to the support structure 2 on the same sides of the camera 1 as the SMA wire 30, there is no interlocking of these components. This allows these testable sub-assemblies to be realised. However this is not applied in the illustrated example, as there is a penalty in the size of the camera land also a likely increase in the component count.

The operation of the camera 1 to drive movement of the lens element 6 along the optical axis O relative to the support structure 2 will now be described.

SMA material has the property that on heating it undergoes a solid-state phase change which causes the SMA material to contract. At low temperatures the SMA material enters the Martensite phase. At high temperatures the SMA enters the Austenite phase which induces a deformation causing the SMA material to contract. The phase change occurs over a range of temperature due to the statistical spread of transition temperature in the SMA crystal structure. Thus heating of the SMA wire 31 causes it to decrease in length. This provides a net tensional force along the optical axis O between the lens element 6 and the support structure 2 in the direction X moving the lens element 6 away from the image sensor 4. This force acts against the biassing force provided by the biassing element 23 and the suspension system 9 in the opposite direction Y along the optical axis O. The biassing element 23 and the flexures 13 deflect depending on the tensional force from the lengths 35 of SMA wire 31. On flexing the biassing element 23 and the flexures 13 remain generally straight although some slight curvature may be generated. Thus the deflection of the biassing element 23 and the flexures 13 provides biassing of the lens element 6 in the direction Y.

The position of the lens element 6 relative to the support structure 2 along the optical axis O may be controlled by control of the temperature of the SMA wire 31. In operation, heating of the SMA wire 31 is provided by passing a current therethrough which provides resistive heating. Cooling is provided by ceasing the current and allowing the SMA wire 31 to cool by conduction to their surroundings. The current is controlled by a control circuit 50 which is described further below.

The SMA wire 31 may be made of any suitable SMA material, for example Nitinol or another Titanium-alloy SMA material. Advantageously, the material composition and pretreatment of the piece of SMA wire 31 is chosen so that the phase change occurs over a range of temperature which is (a) above the expected ambient temperature during normal operation, typically above 70° C. and (b) as wide as possible to maximise the degree of positional control.

High speed actuation of the lens element 6 is desired in many applications, for example if an auto-focus function is provided. The speed of response of the actuation is limited by the cooling of SMA wire 31. The cooling maybe speeded up by reducing the thickness of the SMA wire 31. For the size of cameras and wires under consideration, the cooling time changes approximately linearly with wire diameter. For this reason, the thickness of the SMA wire 31 is desirably at most 35 m to provide a response which is acceptable for an auto-focus application of the camera 1.

Figure 14:
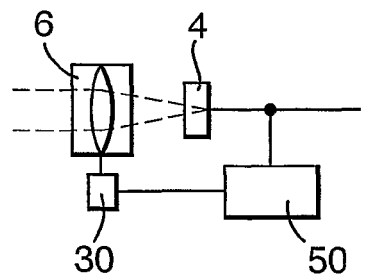
FIG. 14 is a schematic diagram of the overall control arrangement of the camera.

The nature of the control circuit 50 and the control effected thereby will now be described. A schematic view of the overall control arrangement is shown in FIG. 14. The control circuit 50 is connected to the SMA actuator 30 and applies a current thereto to control the temperature of the SMA actuator 30 which moves the lens element 6 and changes the focus of the image formed on the image sensor 4. The output of the image sensor 4 is supplied to the control circuit 50 to be processed for determination of a measure of the quality of focus.

Figure 15:
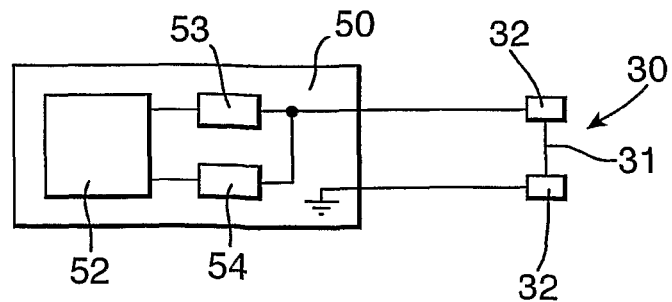
FIG. 15 is a diagram of the control circuit.

The control circuit 50 is shown in FIG. 15. The control circuit 50 is connected to each of the crimping members 32 which provide electrical connection to the piece of SMA wire 31 by means of the crimping thereof. The electrical connections 55 between the control circuit 50 and the crimping members 32 are formed by a conductive adhesive (e.g. silver-filled epoxy). It is undesirable to solder the control circuit 50 to the SMA actuator 30 because of potential damage caused by heating during the soldering process, or because of flux emissions caused by the soldering process.

The control circuit 50 supplies a current between the two crimping members 32. The control circuit 50 controls the degree of heating of the piece of SMA wire 31 by varying the power of the current flowing therethrough. The control circuit 50 varies the power of the current in response to the resistance of the piece of SMA wire 31 which is used as a measure of the position of the lens element 6. Other measures of position such as the temperature measured by a temperature sensor or a direct measure of the position of the lens element 6 output by a position sensor could be used, but a resistance sensor is advantageous because it does not increase the package size of the camera due to being implemented merely by additional components in the control circuit 50.

The physical phenomena behind the use of resistance are as follows.

On heating of the SMA, there is an increase of resistivity with temperature as for most materials. This occurs inside and outside the range of temperature over which the phase-change occurs (the phase transition range) and hence over which the SMA contracts. However inside the phase transition range two further effects occur. Firstly, the Austenite phase has a higher resistivity than the Martensite phase which tends to increase resistance with temperature. However, an opposing effect is that the change of geometry, involving a reduced length and increased cross-sectional area, tends to reduce resistance with temperature. This opposing effect is significantly greater than the other effects. Thus, during heating from low temperature, when the phase transition range is reached and the SMA starts to contract, after an initial rise of resistance the geometrical effect rapidly dominates with the result that during the major part of the contraction the resistance of the SMA actuator decreases. This occurs until the phase change has occurred in nearly all of the SMA so that the degree of contraction falls allowing the resistance to rise.

Thus, SMA has a property that resistance varies with length during heating and contraction along a curve of the form shown in FIG. 16 which is a graph of resistance of the SMA against length of the SMA, corresponding to the position x of the lens element 6, the length increasing as the SMA contracts corresponding to increasing temperature. Thus across the phase transition range, the lens element 6 moves across a positional range x due to the contraction of the SMA. The resistance rises across a small initial part of the positional range x to a local maximum 60 having a resistance value Rmax. The resistance falls across the major part of the positional range x to a local minimum 61 having a resistance value Rmin, whereafter the resistance rises across a small final part of the positional range x.

Due to this property of SMA material, the control circuit 50 implements control based on the measured resistance as follows. From an unheated state, the control circuit 50 heats the piece of SMA wire 31 until the local maximum resistance value is detected. This is used as an indication that contraction has started to occur. In fact a small amount of contraction has already occurred. However the local resistance maximum 60 can be easily detected, whereas the start of the positional range x cannot. Accordingly, the local resistance maximum 60 is used and this is so close to the start of the positional range x that the loss of movement is not significant.

Thereafter the control circuit 50 heats the piece of SMA wire 31 using the measured resistance as a measure of position. The local minimum resistance 61 is used to indicate the end of the positional range x. In fact, a small amount of contraction is still available. However the local minimum resistance 61 can be easily detected, whereas the end of the positional range x cannot. Accordingly, the local minimum resistance 61 is used. This is so close to the end of the of the positional range x that the loss of movement is not significant. Furthermore use of the positional range x above the local minimum resistance 61 can reduce the lifetime of the piece of SMA wire 31 as described further below.

The control circuit 50 uses pulse-width modulation (PWM). In particular, the control circuit 50 applies a pulse-width modulated current pulses (which may be of constant current or constant voltage) and varies the duty cycle in order to vary the power of the current applied and hence the heating. Use of PWM provides the advantage that the amount of power supplied may be accurately controlled with a fine resolution. This method provides a high signal-to-noise ratio, even at low drive power. The PWM may be implemented using known PWM techniques. Typically, the control circuit 50 will continually supply a pulse of current, for example with a duty cycle varying in the range from 5% to 95%. When the duty cycle is at a low value within this range, the average power in the piece of SMA wire 31 is low and so the wire cools even though some current is being supplied. Conversely, when the duty cycle is at a high value in the range, the piece of SMA wire 31 heats. The resistance is measured during the current pulse, for example after a short, predetermined delay from the start of the pulse.

During heating of the piece of SMA wire 31 from a cool state below the phase transition range, the resistance varies with position in the manner shown in FIG. 16 in a manner which is consistent from sample to sample and in successive heating cycles. However, during cooling the resistance changes along a curve of similar form but the variation of resistance is less repeatable from sample to sample and there is variable hysteresis as compared to the heating. This does not prevent the use of resistance as a measure of position during cooling altogether, but does reduce the accuracy of the control. This problem is avoided by the control circuit 50 following a predetermined and repeated motion in which positional control is only effected during heating of the sample as described below.

The control circuit 50 includes the following components.

The control circuit 50 includes a drive circuit 53 which is connected to supply current to the piece of SMA wire 31. The drive circuit 53 may be a constant-voltage current source or a constant-current current source. For example, in the latter case the constant current might be of the order of 120mA.

The control circuit 50 further includes a detection circuit 54 arranged to detect the resistance of the SMA actuator 30.

In the case that the drive circuit 53 is a constant-current current source, the detection circuit 54 may be a voltage detection circuit operable to detect the voltage across the SMA actuator 30 which is a measure of the resistance of the piece of SMA wire 31.

In the case that the drive circuit 53 is a constant-voltage current source, the detection circuit 54 may be a current detection circuit.

For a higher degree of accuracy the detection circuit 54 may comprise a voltage detection circuit and a current detection circuit operable to detect the voltage and current across the SMA actuator and to derive a measure of resistance as the ratio thereof.

A controller 52 implemented by a suitable microprocessor controls the drive circuit 53 to supply a pulse-width modulated current. The controller 52 receives the resistance measured by the detection circuit 54 and performs the PWM control in response thereto.

The control circuit 50 may have a detailed circuit implementations as shown in, and described with reference to, FIGS. 17 and 18 of WO-2008/129290 which is incorporated herein by reference.

The control circuit 50 varies the power of the current using the measured resistance of the SMA actuator as a feedback signal to drive the measured resistance to a target value. In particular, the duty cycle of the pulse-width modulated current is varied. The controller 52 may implement a number of control algorithms to vary the duty cycle. One possibility is proportional control in which the duty cycle is varied by an amount proportional to the difference between the detected resistance and the target resistance. As the piece of SMA wire 31 heats across the active temperature region, the decrease in resistance is sensed and used in a feedback control technique. The stability of the feedback control is maintained by the inherent proportional-integral action of the piece of SMA wire 31 itself during heating. The overall feedback response is dominated by the response of the whole of the heating of the piece of SMA wire 31. Such a proportional control feedback loop provides for accurate control of position.

The piece of SMA wire 31 may have some non-linearities in its response. Such non-linearities may be limited by incorporating precompensation in the control circuit 50. One option is for the precompensation to consist of a gain or offset modifier on the output signal supplied to the drive circuit 53, for example based on the demand and the history of the demand signal. This is most beneficial if insufficient feedback is present to control the piece of SMA wire 31.

The control circuit 50 may implement an autofocus algorithm. In this case, the control may be based on a measure of the focus of the image, for example a modulation transfer function or a spatial frequency response, derived by the controller 52 from the image signal from the image sensor 4. A wide range of suitable measures are known and any such measure may be applied.

In this case, there is a limitation that the derivation of the measure of focus is slow. To combat this, during a scan across many focus positions, at the desired focus position determined from the measure of focus, the control circuit 50 may determine the resistance value. Then at the end of the scan the lens element 6 is driven back to the same position of the basis of that resistance value rather than the focus measure.

In this case, an image signal from the image sensor 4 is used to derive the primary feedback parameter, any drifting in the absolute values of the measure of the position as a secondary parameter over repeated cycles and age is irrelevant, as there is no perceivable change over the course of a single autofocus cycle. In a given camera 1, the resistance might vary from 10at high temperature to 12at low temperature, and then over the course of several 100k cycles, this may change to 15at high temperature and 20at low temperature. However, for any given cycle, best focus will correspond to a specific resistance to a sufficient degree of accuracy. Thus it is only necessary to return to this specific resistance, irrespective of its absolute value.

Examples of control algorithms which may be performed by the controller 52 are described in the following applications filed by the same applicant: International Patent Application No. PCT/GB07/001050 (WO-2007/113478); International Patent Application No. PCT/GB08/000478 (WO-2008/099156); International Patent Application No. PCT/GB08/001402 (WO-2008/129291); and International Patent Application No. PCT/GB08/000477 (WO-2008/099155), each of which is incorporated herein by reference.

Whilst the embodiments described above relate to a camera incorporating an SMA actuation arrangement which drives movement of a camera lens element, the SMA actuation arrangements described can equally be adapted to drive movement of an object other than a camera lens element.

The invention claimed is:

1. An apparatus comprising:
   a support structure;
   a movable element;
   a suspension system comprising a plurality of flexures coupled between the support structure and the movable element to support the movable element on the support structure and to guide movement of the movable element along a movement axis by deflection of the flexures;
   an actuator arrangement arranged to apply an actuation force to the movable element along the movement axis, the actuation force also generating a moment around the centre of mass of the movable element,
   wherein the flexures are non-uniformly configured such that the flexures, on movement of the movable element along the movable axis without rotation, apply forces having differing components perpendicular to the movement axis, which components generate a net moment around the centre of mass of the movable element in an opposite sense from the moment generated by the actuation force.

2. An apparatus according to claim 1, wherein the flexures include at least one first flexure and at least one second flexure arranged at different positions along the movement axis.

3. An apparatus according to claim 1, wherein said moment generated by said flexures balances said moment generated by the actuation force, thereby preventing rotation of the movable element.

4. An apparatus according to claim 1, wherein said flexures extend around the movement axis.

5. An apparatus according to claim 1, wherein the actuator arrangement comprises a shape memory alloy actuator.

6. An apparatus according to claim 1, wherein the shape memory alloy actuator comprises shape memory alloy wire coupled between the support structure and the movable element.

7. An apparatus according to claim 1, wherein the movable element is a camera lens element, the movement axis being the optical axis of the camera lens element.

8. An apparatus according to claim 2, wherein the at least one first flexure comprises at least one pair of flexures arranged with mirror symmetry about a notional plane perpendicular to said moment around the centre of mass generated by the actuation force, and the at least one second flexure also comprises at least one pair of flexures arranged with mirror symmetry about said notional plane.

9. An apparatus according to claim 2, wherein the at least one first flexure and the at least one second flexure are non-uniformly configured to apply said forces by having different lengths.

10. An apparatus according to claim 2, wherein the at least one first flexure and the at least one second flexure are non-uniformly configured to apply said forces by being deflected, at a given position of the movable element, by different amounts from their respective non-deflected positions.

11. An apparatus according to claim 2, wherein the at least one first flexure and the at least one second flexure are non-uniformly configured to apply said forces by having different lengths and by being deflected, at a given position of the movable element, by different amounts from their respective non-deflected positions.

12. An apparatus according to claim 5, wherein
the shape memory alloy actuator is arranged to apply said actuation force to the movable element in a first direction along the movement axis, on contraction of the shape memory alloy actuator, and
the actuator arrangement further comprises a biassing element arranged to bias the movable element relative to the support structure in a second direction along the movement axis, opposite to the first direction.

13. An apparatus according to claim 12, wherein the apparatus further comprises an end-stop arranged to limit the movement of the movable element in a second direction along the movement axis, opposite to the first direction, the apparatus being arranged such that, when the moveable element is held against the end-stop, the force applied by the biassing element in said second direction is greater than the force applied by the flexures of the suspension system.

14. An apparatus according to claim 6, wherein the shape memory alloy wire extends at an acute angle to the movement direction of the movable element.

15. An apparatus according to claim 14, wherein the shape memory alloy wire comprises two portions arranged with mirror symmetry about a notional plane perpendicular to said moment around the centre of mass generated by the actuation force.

16. An apparatus according to claim 15, wherein the shape memory wire is a continuous piece hooked over the movable element to form the two portions on either side thereof.

17. An apparatus according to claim 7, wherein the camera lens element comprises one or more lenses having a diameter of at most 10 mm.

18. A shape memory alloy actuation apparatus comprising:
a support structure;
a movable element;
a suspension system arranged to support the movable element on the support structure and to guide movement of the movable element along a movement axis;
a shape memory alloy wire coupled between the support structure and the movable element and arranged to apply an actuation force to the movable element in a first direction along the movement axis on contraction of the shape memory alloy wire,
the shape memory alloy wire being coupled to the support structure by a crimping member and by a curved surface formed on the support structure, the crimping member crimping the shape memory alloy wire and being fixed to the support structure holding the shape memory alloy wire against the curved surface from which curved surface the shape alloy memory wire extends to the movable element.

19. A shape memory alloy actuation apparatus according to claim 18, wherein the shape memory alloy wire extends at an acute angle to the movement direction of the movable element.

20. A shape memory alloy actuation apparatus according to claim 18, wherein the movable element is a camera lens element, the movement axis being the optical axis of the camera lens element.

21. A shape memory alloy actuation apparatus according to claim 19, wherein the shape memory alloy wire comprises two portions arranged with mirror symmetry about a notional plane between said portions, each portion being coupled by said crimping member and curved surface.

22. A shape memory alloy actuation apparatus according to claim 21, wherein the shape memory wire is a continuous piece hooked over the intermediate body to form the two portions on either side thereof.

23. A shape memory alloy actuation apparatus according to claim 20, wherein the camera lens element comprises one or more lenses having a diameter of at most 10 mm.

\* \* \* \* \*